United States Patent
Zhan et al.

(10) Patent No.: US 12,466,138 B2
(45) Date of Patent: Nov. 11, 2025

(54) STAGED SHEARING AND FORMING METHODS FOR T-BAR CYLINDRICAL MEMBERS

(71) Applicant: NORTHWESTERN POLYTECHNICAL UNIVERSITY, Shaanxi (CN)

(72) Inventors: Mei Zhan, Xi'an (CN); Danni Bai, Xi'an (CN); Xiaoguang Fan, Xi'an (CN); Pengfei Gao, Xi'an (CN); Fei Ma, Xi'an (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 43 days.

(21) Appl. No.: 18/664,281

(22) Filed: May 14, 2024

(65) Prior Publication Data
US 2024/0308153 A1    Sep. 19, 2024

(30) Foreign Application Priority Data
Mar. 14, 2023   (CN) .......................... 202310239465.1

(51) Int. Cl.
B29C 67/00     (2017.01)
B21D 22/16    (2006.01)
B29D 22/00    (2006.01)

(52) U.S. Cl.
CPC .......... B29C 67/0003 (2013.01); B21D 22/16 (2013.01); B29C 67/0014 (2013.01); B29C 67/0022 (2013.01); B29D 22/00 (2013.01)

(58) Field of Classification Search
CPC .... B29D 23/00; B29D 22/00; B29C 67/0022; B29C 67/0014; B29C 67/0003; B21D 22/16
See application file for complete search history.

(56) References Cited

U.S. PATENT DOCUMENTS

| | | | |
|---|---|---|---|
| 5,806,358 A | * | 9/1998 | Rolf ...................... B21D 22/16 72/82 |
| 2009/0278399 A1 | | 11/2009 | Srivats et al. |

(Continued)

FOREIGN PATENT DOCUMENTS

| | | |
|---|---|---|
| CN | 1313798 A | 9/2001 |
| CN | 109465321 | 3/2019 |

(Continued)

OTHER PUBLICATIONS

CN113617915 machine translation (Year: 2021).*

(Continued)

*Primary Examiner* — Alison L Hindenlang
*Assistant Examiner* — Alexander A Wang
(74) *Attorney, Agent, or Firm* — PORUS IP LLC

(57) ABSTRACT

The present disclosure provides a staged shearing and forming method for a T-bar cylindrical member, comprising: controlling a shear working surface of a shear spinning wheel in contact with a surface of a cylindrical member blank; controlling a circumferential rotation of the cylindrical member blank; controlling a working surface of a flow spinning wheel to be in perpendicular contact with a surface of the unsaturated I-bar cylindrical member and controlling the cylindrical member blank to be maintained in a circumferential rotational state; controlling the flow spinning wheel to thin one side of the unsaturated I-bar cylindrical member; controlling a fractal working surface of a fractal spinning wheel in contact with a top of the saturated I-bar structure; controlling a working surface of a flat spinning wheel to be in perpendicular contact with a surface of the Y-bar cylindrical member.

10 Claims, 8 Drawing Sheets

(56) References Cited

U.S. PATENT DOCUMENTS

2015/0343511 A1\* 12/2015 Kim .................... B21D 19/046
                                                            72/83
2023/0381847 A1\* 11/2023 Sung ................... G05B 19/042

FOREIGN PATENT DOCUMENTS

| CN | 110900120   |  3/2020 |
|----|-------------|---------|
| CN | 111346963 A |  6/2020 |
| CN | 113617915   | 11/2021 |
| CN | 114147117 A |  3/2022 |
| CN | 114192647   |  3/2022 |
| JP | H10286634   | 10/1998 |
| JP | 2002126824  |  5/2002 |

OTHER PUBLICATIONS

Notification to Grant Patent Right for Invention in Chinese Application No. 202310239465.1 mailed on Mar. 27, 2025, 5 pages.

Lei, Yudong et al., A review on manufacturing technologies of thin-walled components with ribs, Journal of Northwestern Polytechnical University, 40(1): 1-17, 2022.

Lyu, Wei et al., Rib filling behavior in flow forming of thin-walled tube with helical grid-stiffened ribs, The International Journal of Advanced Manufacturing Technology, 2877-2894, 2022.

\* cited by examiner

100

- 110 controlling a shear working surface of a shear spinning wheel to be in contact with a surface of a cylindrical workpiece blank

- 120 controlling a circumferential rotation of the cylindrical workpiece blank driven by the mandrel and controlling an axial feeding of the shear spinning wheel along the cylindrical workpiece blank until a feeding amount of the shear spinning wheel satisfies a first preset condition

- 130 controlling a working surface of a flow spinning wheel to be in perpendicular contact with a surface of the unsaturated I-bar cylindrical workpiece and controlling the cylindrical workpiece blank to be maintained in a circumferential rotational state

- 140 controlling the flow spinning wheel to thin one side of the unsaturated I-bar cylindrical workpiece until a wall thickness difference on both sides of the unsaturated I-bar cylindrical workpiece satisfies a preset difference condition, controlling the flow spinning wheel to shape the unsaturated I-bar structure

- 150 controlling a fractal working surface of a fractal spinning wheel to be in contact with a top of the saturated I-bar structure, controlling the cylindrical workpiece blank to maintain the circumferential rotation state to control the fractal spinning wheel to perform a radial feeding movement

- 160 controlling a working surface of a flat spinning wheel to be in perpendicular contact with a surface of the Y-bar cylindrical workpiece, controlling the cylindrical workpiece blank to maintain the circumferential rotational state, controlling the flat spinning wheel to feed radially along a top of the Y-bar to obtain a T-bar cylindrical workpiece

FIG. 1

STAGED SHEARING AND FORMING METHODS FOR T-BAR CYLINDRICAL MEMBERS

CROSS-REFERENCE TO RELATED APPLICATIONS

This application claims priority to Chinese Patent Application No. 202310239465.1, filed on Mar. 14, 2023, the entire contents of which are hereby incorporated by reference.

TECHNICAL FIELD

The present disclosure relates to the field of plastic processing of thin-walled parts, and in particular relates to a staged shearing and forming method for a T-bar cylindrical member.

BACKGROUND

With the development of high-end equipment such as rockets, missiles, and satellites in the aerospace field, especially the increasing requirements for large capacity, low consumption, and long lifespan of new-generation warplanes and large-scale carrier rockets, there is a growing demand for key components to be high-performance, lightweight, and high-precision, resulting in a large number of lightweight and high-strength materials used in the application of complex thin-walled T-bar cylindrical members. However, the hard-to-form features of these components make high-performance monolithic plastic forming very difficult.

The main methods of machining or block forming and reassembly used at present have many problems, such as low material utilization, long cycle time, cut off of the metal flow line, generation of residual stresses, and shape distortion with microcrack sprouting. Therefore, there is a need to develop new methods of integral plastic forming.

The spinning process is regarded as a potential method because of its advantages such as low molding load, high flexibility, and high molding accuracy. Currently, the forming method for cylindrical members with longitudinal ribs on the inner wall combines the advantages of flow spinning and hot working, but it has high requirements for the spinning mandrel, and there are issues such as high energy consumption and easy pollution, making it difficult to extend to T-bar cylindrical members.

Therefore, there is a need to provide a staged shearing and forming method for a T-bar cylindrical member to improve efficiency and quality.

SUMMARY

One or more embodiments of the present disclosure provide a staged shearing and forming method for a T-bar cylindrical member, wherein the method achieves an integral plastic forming of the T-bar cylindrical member at room temperature, thereby increasing a forming efficiency and decreasing a production cost.

One or more embodiments of the present disclosure provide a staged shearing and forming method for a T-bar cylindrical member, wherein the method is performed by a processor, comprising: controlling a shear working surface of a shear spinning wheel to be in contact with a surface of a cylindrical member blank; wherein the shear spinning wheel is mounted on a spinning wheel stand of a numerically controlled spinning machine, and the cylindrical member blank is mounted on a mandrel of the numerically controlled spinning machine; controlling a circumferential rotation of the cylindrical member blank driven by the mandrel and controlling an axial feeding of the shear spinning wheel along the cylindrical member blank until a feeding amount of the shear spinning wheel satisfies a first preset condition, thus obtaining an unsaturated I-bar cylindrical member with an unsaturated I-bar structure; controlling a working surface of a flow spinning wheel to be in perpendicular contact with a surface of the unsaturated I-bar cylindrical member and controlling the cylindrical member blank to be maintained in a circumferential rotational state, the flow spinning wheel being mounted on the spinning wheel stand of the numerically controlled spinning machine; controlling the flow spinning wheel to thin one side of the unsaturated I-bar cylindrical member until a wall thickness difference on both sides of the unsaturated I-bar cylindrical member satisfies a preset difference condition, controlling the flow spinning wheel to shape the unsaturated I-bar structure, thus obtaining a saturated I-bar cylindrical member with a saturated I-bar structure; controlling a fractal working surface of a fractal spinning wheel to be in contact with a top of the saturated I-bar structure, controlling the cylindrical member blank to maintain the circumferential rotation state to control the fractal spinning wheel to perform a radial feeding movement, wherein until a feeding amount of the fractal spinning wheel satisfies a second preset condition, a Y-bar cylindrical member with a Y-bar is obtained, and the fractal spinning wheel is mounted on the spinning wheel stand of the numerically controlled spinning machine; controlling a working surface of a flat spinning wheel to be in perpendicular contact with a surface of the Y-bar cylindrical member, controlling the cylindrical member blank to maintain the circumferential rotational state, controlling the flat spinning wheel to feed radially along a top of the Y-bar to obtain a T-bar cylindrical member, and the flat spinning wheel being mounted on the spinning wheel stand of the numerically controlled spinning machine.

One or more embodiments of the present disclosure provide a staged shearing and forming system of a T-bar cylindrical member, comprising: a first control module configured to control a shear working surface of a shear spinning wheel to be in contact with a surface of a cylindrical member blank; wherein the shear spinning wheel is mounted on a spinning wheel stand of a numerically controlled spinning machine, and the cylindrical member blank is mounted on a mandrel of the numerically controlled spinning machine; a second control module configured to control a circumferential rotation of the cylindrical member blank driven by the mandrel and control an axial feeding of the shear spinning wheel along the cylindrical member blank until a feeding amount of the shear spinning wheel satisfies a first preset condition, thus to obtain an unsaturated I-bar cylindrical member with an unsaturated I-bar structure; a third control module configured to control a working surface of a flow spinning wheel to be in perpendicular contact with a surface of the unsaturated I-bar cylindrical member and control the cylindrical member blank to be maintained in a circumferential rotational state, the flow spinning wheel being mounted on the spinning wheel stand of the numerically controlled spinning machine; a fourth control module configured to control the flow spinning wheel to thin one side of the unsaturated I-bar cylindrical member until a wall thickness difference on both sides of the unsaturated I-bar cylindrical member satisfies a preset difference condition, control the flow spinning wheel to shape the unsaturated I-bar structure, thus to obtain a saturated I-bar cylindrical member with a saturated I-bar structure; a fifth control module configured to control a fractal working surface of a fractal spinning wheel to be in contact with a top of the saturated I-bar structure, control the cylindrical member blank to maintain the circumferential rotation state to control the fractal spinning wheel to perform a radial feeding movement, wherein until a feeding amount of the fractal spinning wheel satisfies a second preset condition, a Y-bar cylindrical member with a Y-bar is obtained, and the fractal spinning wheel is mounted on the spinning wheel stand of the numerically controlled spinning machine; a sixth control module configured to control a working surface of a flat spinning wheel to be in perpendicular contact with a surface of the Y-bar cylindrical member, control the cylindrical member blank to maintain the circumferential rotational state, control the flat spinning wheel to feed radially along a top of the Y-bar to obtain a T-bar cylindrical member, and the flat spinning wheel being mounted on the spinning wheel stand of the numerically controlled spinning machine.

One or more embodiments of the present disclosure provide a non-transitory computer-readable storage medium, comprising a set of instructions, wherein when a computer reads the computer instructions in the storage medium, the staged shearing and forming method of a T-bar cylindrical member.

BRIEF DESCRIPTION OF THE DRAWINGS

This description will be further explained in the form of exemplary embodiments, which will be described in detail by means of accompanying drawings. These embodiments are not restrictive, in which the same numbering indicates the same structure, wherein:

FIG. 1 is an exemplary flowchart illustrating a staged shearing and forming method for a T-bar cylindrical member according to some embodiments of the present disclosure;

Figure 2:
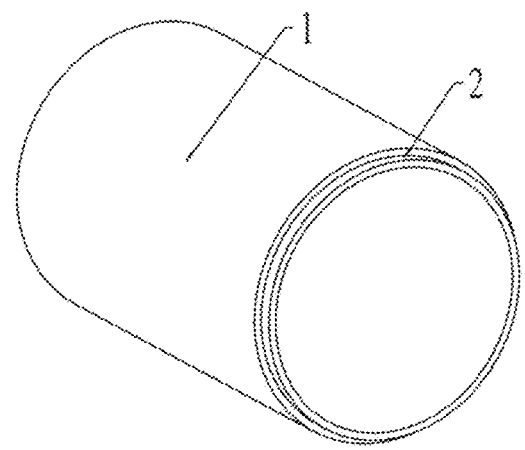
FIG. 2 is a structural diagram illustrating a cylindrical member blank according to some embodiments of the present disclosure.
Figure 3:
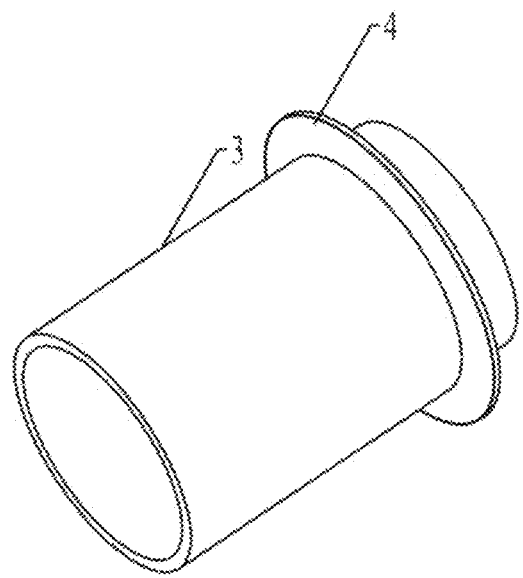
FIG. 3 is a structural diagram illustrating an unsaturated I-bar cylindrical member according to some embodiments of the present disclosure.

Attachment markings illustrate: 1. a cylindrical member blank; 2. a positioning step; 3. an unsaturated I-bar cylindrical member; 4. an unsaturated I-bar structure; 5. a saturated I-bar cylindrical member; 6. a saturated I-bar structure; 7. a Y-bar cylindrical member; 8. a Y-bar structure; 9. a T-bar cylindrical member; 10. a T-bar structure; 11. a mandrel; 12. a shear spinning wheel; 121. an upper shear working surface; 122. a lower shear working surface; 13. a flow spinning wheel; 131. a first flow surface; 132. a second flow surface; 14. a fractal spinning wheel; 141. a first fractal surface; 142. a second fractal surface; 15. a flat spinning wheel.

DETAILED DESCRIPTION

The current spinning forming method for a cylindrical member is suitable for the forming of an I-ribbed cylindrical member. However, due to the inability to overcome the dependence of the component structural characteristics on the mold, it cannot satisfy the forming of a T-bar cylindrical member.

In view of the foregoing, some embodiments of the present disclosure are expected to provide a staged shearing and forming method for a T-bar cylindrical member. This method is based on a spinning forming process of a cylindrical member and a multi-directional collaborative loading of a spinning wheel. The shear spinning wheel is loaded axially along a cylindrical member blank, causing the material to flow from an axial direction to a radial direction, thus forming an I-bar cylindrical member. A flow spinning wheel is loaded twice in both forward and reverse axial directions, thinning the other side of the cylindrical blank and making the I-bar more full. A fractal spinning wheel feeds radially along a top of the I-bar, causing the material to flow from the radial direction to the axial direction, thus forming a Y-bar cylindrical member. A flat spinning wheel feeds radially along a top of the Y-bar, and the material continues to flow from the radial direction to the axial direction until a T-bar cylindrical part is formed.

FIG. 1 is an exemplary flowchart illustrating a staged shearing and forming method for a T-bar cylindrical member according to some embodiments of the present disclosure. As shown in FIG. 1, process 100 includes the following steps. The process 100 may be executed by a processor.

A numerically controlled spinning machine is a numerically controlled spinning machine that may be operated using a coded program. The numerically controlled spinning machine is capable of using a spinning wheel to rotate and extrude a cylindrical member blank 1, causing a portion of material on the cylindrical member blank 1 to flow in a preset direction and undergo plastic deformation to form a desired shape. The preset direction may include an axial direction and/or a radial direction of the cylindrical member blank 1.

In some embodiments, the processor may mount the cylindrical member blank on a mandrel of the numerically controlled spinning machine by controlling the clamping device for subsequent machining operations.

The clamping device is a device configured to hold a workpiece (e.g., the cylindrical member blank) on a machining device.

In some embodiments, the clamping device may be configured to be driven by a motor structure. For example, the clamping device may be configured to drive the clamping device based on the motor structure to perform displacement and/or clamping actions, etc.

In some embodiments, the clamping device may include one or more flexible pads. The flexible pads are configured to increase a contact area between the clamping device and the cylindrical member blank as a means of reducing surface damage to the cylindrical member blank due to a clamping force. The flexible pads may be made of an elastic material, such as, for example, other materials having elasticity such as rubber, or the like.

In some embodiments, a plurality of flexible pads may be symmetrically distributed on an inner wall of the clamping device to maintain even distribution of the clamping force, thereby avoiding deflection or instability of the cylindrical member blank during the clamping process.

In some embodiments, the processor may obtain an installation position of the cylindrical member blank via a photoelectric sensor. Upon a determination that the installation position matching a specified position, the processor may control the cylindrical member blank to be fixed on the mandrel.

The installation position is a parameter characterizing a current position of the cylindrical member blank. The installation position may include a spatial coordinate of the cylindrical member blank. For example, the processor may establish a spatial coordinate system based on the numerically controlled spinning machine and calculate the spatial coordinate corresponding to the installation position based on a coordinate of the specified position, a distance, and an angle of the specified position relative to a position of the cylindrical member blank.

The specified position is a preset location where the cylindrical member blank needs to be configured. For example, the processor may determine the coordinate of the specified position based on a spatial coordinate entered by a user prior to machining.

The photoelectric sensor is a device capable of detecting and sensing changes in light, and thus determining the distance between the mandrel and the cylindrical member blank, and converting it into an electrical signal. The photoelectric sensor is configured on a frame of a numerically controlled spinning machine to identify and locate the installation position of the cylindrical member blank and periodically convert the installation position into an electrical signal for transmission to the processor, which analyzes the electrical signal to determine the installation position. The processor may control the cylindrical member blank to be fixed on the mandrel when the electrical signal carries information indicating that the installation position has reached the specified position. For example, upon detecting that the electrical signal carries the information indicating the installation position has reached the designated position, the processor may control the cylindrical member blank to be fixed on the mandrel.

In some embodiments, by configuring the photoelectric sensor to determine whether the cylindrical member blank has reached the designated position, it may improve a positioning accuracy of the blank, reduce errors and scrap rates, and increase processing efficiency.

By controlling the clamping device comprising flexible pads for mounting the cylindrical member blank on the mandrel, it is possible to significantly improve the clamping stability, enhance the machining flexibility, and increase the productivity, thereby ensuring efficient and high-precision machining of the T-bar cylindrical member. By uniformly mounting the flexible pads inside the clamping device, a stable clamping environment is provided for the cylindrical member blank, and the cylindrical member blank is protected from damage.

The cylindrical member blank is a cylindrical shaped workpiece to be machined. As shown in FIG. 2, an outer surface of the cylindrical member blank 1 includes a rotary body-shaped side. The cylindrical member blank 1 includes a rotary body-shaped inner surface. The inner surface and the outer surface of the cylindrical member blank 1 may be coaxial.

As shown in FIG. 2, a positioning step 2 is machined on an end of the cylindrical member blank 1. The positioning step 2 is a stepped surface provided on the cylindrical member blank 1, which may be configured to act as a positioning for a spinning wheel, for example, to act as a positioning for a shear spinning wheel 12. When the numerically controlled spinning machine controls a relative movement of the shear spinning wheel 12 and the cylindrical member blank 1, it may cause at least one face on the shear spinning wheel 12 to abut at least one face on the positioning step 2, so as to position the shear spinning wheel 12. This is conducive to improving the positioning accuracy of the shear spinning wheel 12. The positioning step 2 may be a stepped surface that is outwardly convex and/or inwardly concave with respect to the outer surface of the cylindrical member blank 1. For more information about the shear spinning wheel 12, please refer to its related description below.

A height of the positioning step 2 is such that the positioning step 2 is in a radial direction (e.g., the Z direction in FIG. 11) along the cylindrical member blank 1. For example, the height of the positioning step 2 may be a height difference between the highest point and the lowest point of the positioning step 2 with respect to the outer surface of the cylindrical member blank 1.

A shearing amount is a depth to which the spinning wheel cuts into the cylindrical member blank 1 in a radial direction (e.g., the Z direction in FIG. 11) along the cylindrical member blank 1 when positioning the spinning wheel. The shearing amount may be a first preset value. The processor may obtain the shearing amount in multiple ways. For example, the shearing amount may be obtained from at least one of historical data, manual input, or the like.

After the spinning wheel is positioned based on the positioning step 2, the numerically controlled spinning machine may control the spinning wheel to extrude the cylindrical member blank 1. By controlling the height of the positioning step 2, a relative position accuracy of the spinning wheel to the cylindrical member blank 1 may be controlled.

A third preset condition is a preset condition that controls the height of the positioning step 2. For example, the third preset condition may be that a difference between the height of the positioning step 2 and the shearing amount of the spinning wheel is less than or equal to a second preset value. For example, the third preset condition may be that a difference between the height of the positioning step 2 and the shearing amount of the spinning wheel is zero, etc.

By setting the positioning step, the positioning efficiency and the positioning accuracy of the shear spinning wheel may be improved. Setting the third preset condition enables convenient adjustment of the shearing amount of the shear spinning wheel after it is positioned, facilitating subsequent processing. Setting the third preset condition as the difference between the height of the positioning step and the shearing amount of the shear spinning wheel to be zero, ensures that the relative position of the shear spinning wheel and the cylindrical member blank meets the processing requirements upon positioning, eliminating the need for subsequent adjustment of the shearing amount of the shear spinning wheel, and thus conducive to improving processing efficiency and accuracy.

In some embodiments, the numerically controlled spinning machine may include a frame, a mandrel 11, a spinning wheel stand, a spindle, a drive structure, etc.

The stand serves as a mounting base for the mandrel 11, the spinning wheel stand, the spindle, and the drive structure.

Figure 11:
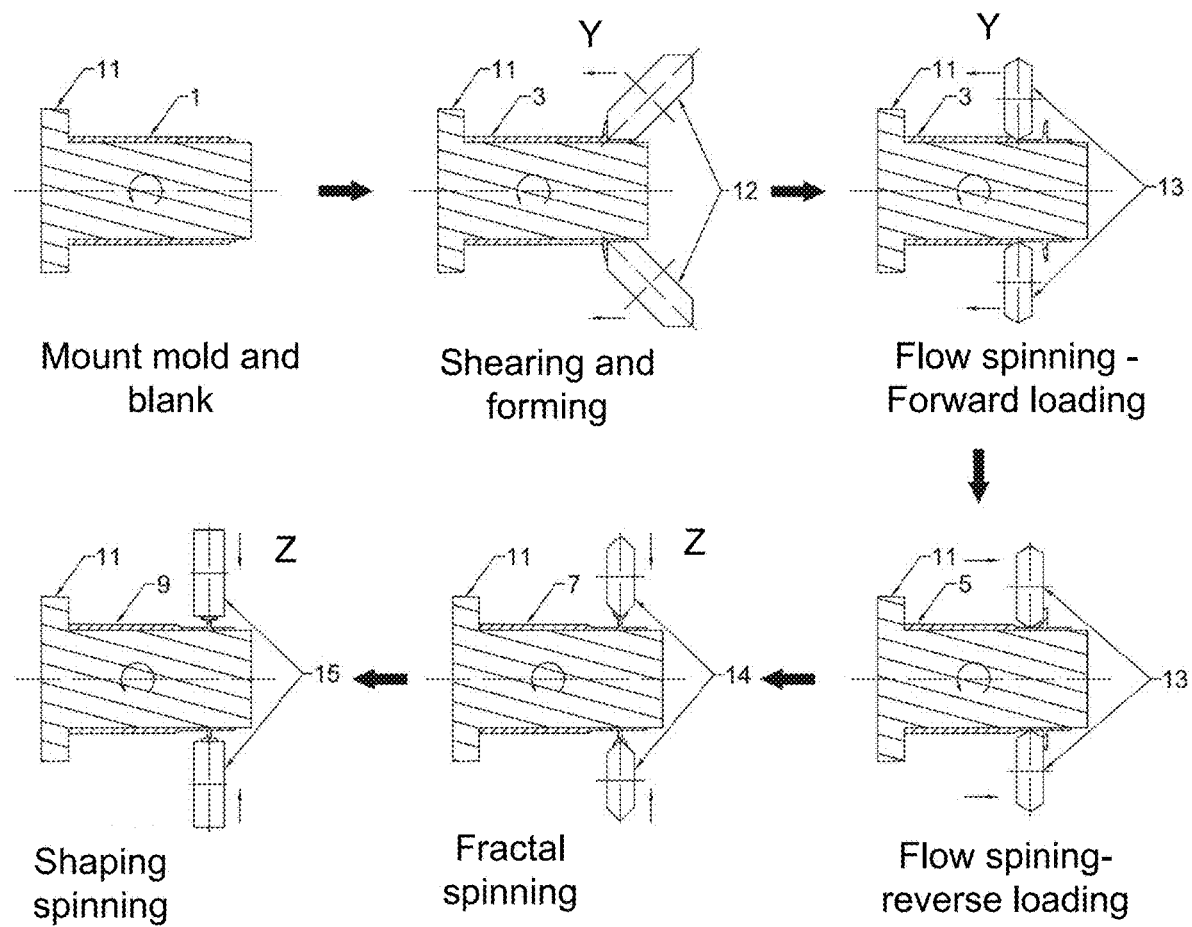
FIG. 11 is a structural diagram illustrating a process of a staged shearing and forming of a T-bar cylindrical member according to some embodiments of the present disclosure.

As shown in FIG. 11, the mandrel 11 may be used as a mounting base for the cylindrical member blank 1. The mandrel 11 may have a rotary body shape. The outer surface of the mandrel 11 may be adapted to fit the inner surface of the cylindrical member blank 1. The mandrel 11 may be connected to the cylindrical member blank 1 in a variety of ways, such as a threaded connection, etc. The mandrel 11 may be connected to the stand in a variety of ways. The mandrel 11 is removably connected to the stand. The mandrel 11 is rotatably connected to the stand.

The spindle refers to a structure used by the numerically controlled spinning machine to output torque. The spindle may be drive-connected to the mandrel 11. The drive structure is a structure that may drive the spindle to rotate.

The spinning wheel stand may be used as a mounting base for mounting the spinning wheel. The spinning wheel stand and the mandrel 11 may move relative to each other. For example, a movement direction of the spinning wheel stand may be parallel to an axis of the mandrel 11. The spinning wheel stand may be drive-connected to the drive structure. The drive structure may drive the spinning wheel stand to move relative to the mandrel 11.

A spinning wheel is a structure that may be configured to extrude the cylindrical member blank 1 from at least one preset direction, causing at least a portion of the material of the cylindrical member blank 1 to flow in the preset direction, thereby plastically deforming the portion of the material to form the desired shape.

In some embodiments, the spinning wheel may be rotatably disposed on the spinning wheel stand. After the spinning wheel comes into contact with the cylindrical member blank on the mandrel 11, the cylindrical member blank drives the spinning wheel as it rotates. When the spinning wheel stand is moved, it may drive the spinning wheel to move relative to the cylindrical member blank.

In some embodiments, a plurality of spinning wheels may be symmetrically disposed with respect to the axis of the mandrel 11. A distance between the plurality of spinning wheels and the mandrel 11 may be adjusted separately. The spinning wheels may be drivably connected to the drive structure. The drive structure may drive the spinning wheels to move relative to the mandrel 11.

In some embodiments, rotation centers of the plurality of spinning wheels may be at certain angles to the axis of the mandrel 11. The angles between the rotation centers of the plurality of spinning wheels and the axis of the mandrel 11 may be the same.

By symmetrically disposing the plurality of spinning wheels with respect to the axis of the mandrel, the plurality of spinning wheels may exert pressure from a plurality of directions on the mandrel and the cylindrical member blank mounted to the mandrel and make the pressures cancel each other, which is helpful for preventing the bending deformation of the mandrel and the cylindrical member blank on the mandrel.

In some embodiments, the spinning wheel may include at least one of a shear spinning wheel 12, a flow spinning wheel 13, a fractal spinning wheel 14, and a flat spinning wheel 15, etc.

As shown in FIG. 11, the shear spinning wheel 12 may be configured to extrude the cylindrical member blank 1 in an axial direction (e.g., in the Y direction in FIG. 11) to cause a portion of the material of the cylindrical member blank 1 to flow in the axial direction (e.g., in the Y direction in FIG. 11) to cause a portion of the material to plastically deform to form a desired shape. The portion of the cylindrical member blank 1 through which the shear spinning wheel 12 passes is thinned. For more information about the shear spinning wheel 12, please refer to FIG. 7.

As shown in FIG. 11, the flow spinning wheel 13 is capable of extruding an unthinned portion of the cylindrical member blank 1 so that the unthinned portion is thinned. For more information about the flow spinning wheel 13, please refer to FIG. 8.

The fractal spinning wheel is a spinning wheel configured to deform at least a portion of another structure, respectively, in different directions, to separate at least a portion of the other structure. The fractal spinning wheel is used, for example, to separate at least a portion of the top of the I-bar to each side.

Figure 9:
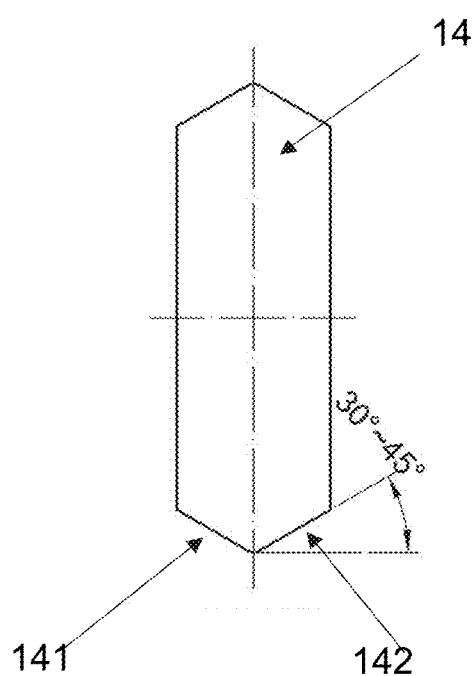
FIG. 9 is a structural diagram illustrating a fractal spinning wheel according to some embodiments of the present disclosure.

As shown in FIG. 9 and FIG. 11, the fractal spinning wheel 14 is capable of compressing and deforming protrusions. A side surface of the fractal spinning wheel 14 is of a convex structure. The side surface of the fractal spinning wheel 14 may include two conical surfaces. The two conical surfaces may be coaxially and symmetrically distributed. The side surface of the fractal spinning wheel 14 may compress and deform the protrusions. For example, the side surface of the fractal spinning wheel 14 compress a circumferential surface of the I-bar in a radial direction (e.g., the Z direction in FIG. 11), causing edges of the I-bar to separate along the side surface of the fractal rotating wheel 14, forming a Y-bar. The Y-bar has a circumferential surface that adapts to the side surface of the fractal spinning wheel 14.

In some embodiments, the fractal spinning wheel 14 may be a second biconical angle spinning wheel. The second biconical angle spinning wheel means that a fractal working surface of the fractal spinning wheel 14 includes two symmetrically arranged conical surfaces or at least a portion of the conical surfaces.

In some embodiments, the fractal working surface of the fractal spinning wheel 14 is a surface on which the fractal spinning wheel 14 compresses the saturated I-bar structure 6. The fractal working surface of the fractal spinning wheel 14 includes a first fractal surface 141 and a second fractal surface 142. The first fractal surface 141 and the second fractal surface 142 are each a conical surface or at least a portion of a conical surface.

The first fractal surface 141 and the second fractal surface 142 are configured to compress a top of the saturated I-bar structure 6, respectively, so that at least a portion of the material at the top of the saturated I-bar structure 6 flows along the first fractal surface 141, and the second fractal surface 142, respectively, thereby altering the shape of the top of the saturated I-bar structure 6 (e.g., splitting away from the I-shape to form a Y-shape).

In some embodiments, a spinning wheel forming angle of the fractal spinning wheel 14 satisfies a second forming angle condition.

The spinning wheel forming angle of the fractal spinning wheel is an angle between a normal line of the first fractal surface 141 and/or the second fractal surface 142 and the axis of the saturated I-bar cylindrical member 5.

In some embodiments, the second forming angle condition means that a second angular range needs to be met for the spinning wheel forming angle of the fractal spinning wheel 14. The second angle range may be 30-45°, etc.

In some embodiments, a radius of a spinning wheel fillet of the fractal spinning wheel 14 satisfies a third radius condition.

The third radius condition means that the radius of the spinning wheel fillet of the fractal spinning wheel 14 is within a third radius range. The third radius range may be 0.5-3 mm, etc.

By using the fractal spinning wheel to fractalize the saturated I-bar structure, it is possible to fracture the saturated I-bar structure to form the Y-bar to meet production requirements. Using the symmetrical first fractal surface and the second fractal surface, it is possible to make the formed Y-bar symmetrical and ensure the shape accuracy of the Y-bar.

Figure 10:
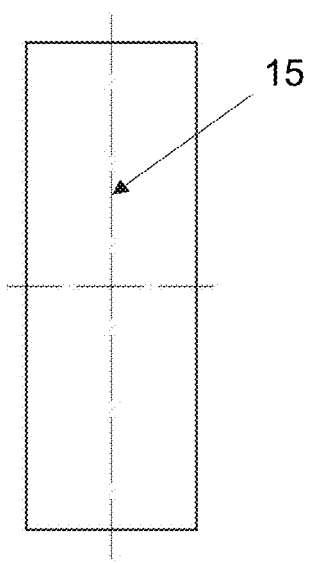
FIG. 10 is a structural diagram illustrating a flat spinning wheel according to some embodiments of the present disclosure.

As shown in FIG. 10, FIG. 11, the flat spinning wheel 15 is capable of compressing and deforming the protrusions. A side surface of the flat spinning wheel 15 is a cylindrical surface. The side surface of the flat spinning wheel 15 may compress and deform the protrusions. For example, the side surface of the flat spinning wheel 15 may compress the circumferential surface of the Y-bar in the radial direction (e.g., the Z direction in FIG. 11) so that a separated portion of the Y-bar is pressurized and deformed in the radial direction (e.g., the Z direction in FIG. 11).

In some embodiments, the cylindrical member blank 1 may be clamped to the mandrel 11 of the numerically controlled spinning machine, and at least one of the shear spinning wheel 12, the flow spinning wheel 13, the fractal spinning wheel 14, the flat spinning wheel 15, or the like may be assembled respectively on the spinning wheel stand of the numerically controlled spinning machine.

In some embodiments, a count of shear spinning wheels, flow spinning wheels, fractal spinning wheels, and flat spinning wheels may all be 2N; where N is a positive integer. The shear spinning wheels, the flow spinning wheels, the fractal spinning wheels, and the flat spinning wheels are mounted symmetrically on the spinning wheel stand of the numerically controlled spinning machine. For example, the count of shear spinning wheels, flow spinning wheels, fractal spinning wheels, flat spinning wheels is two, and the shear spinning wheels, flow spinning wheels, fractal spinning wheels, and flat spinning wheels are symmetrically distributed and mounted on the spinning wheel stand of the numerically controlled spinning machine.

By configuring a plurality of shear spinning wheels, flow spinning wheels, fractal spinning wheels, flat spinning wheels (2N, where N is a positive integer), and distributing them symmetrically on the spinning wheel stand, multiple spinning wheels may be realized to work simultaneously, thus effectively improving the processing efficiency.

In some embodiments, a worker may input process parameters into the numerically controlled spinning machine. For example, into a processor of the numerically controlled spinning machine. The processor may generate a movement trajectory of the spinning wheel based on the process parameter.

The process parameter is a parameter associated with the numerically controlled spinning machine controlling the spinning wheel to process the cylindrical member blank 1 wherein a feeding amount is a distance that the spinning wheel is moved along the axial or radial direction of the cylindrical member blank 1 after the spinning wheel shears into the cylindrical member blank 1. For more information about the shearing amount, please refer to the preceding description. A feeding speed of the spinning wheel is a speed at which the spinning wheel moves when it feeds along the axial or radial direction of the cylindrical member blank 1. The movement trajectory is a route along which the spinning wheel moves under the control of the numerically controlled spinning machine.

Operation 110, controlling a shear working surface of a shear spinning wheel to be in contact with a surface of a cylindrical member blank.

In some embodiments, the shear working surface includes an upper shear working surface 121 and a lower shear working surface 122. For more information about the upper shear working surface 121 and the lower shear working surface 122, please refer to FIG. 7.

As shown in FIG. 11, the processor may control the contact of the shear working surface of the shear spinning wheel 12 with the positioning step 2 of the cylindrical member blank 1. The positioning step 2 may serve to position the shear spinning wheel 12 and improve the positioning accuracy of the shear spinning wheel 12.

Operation 120, controlling a circumferential rotation of the cylindrical member blank driven by the mandrel and controlling an axial feeding of the shear spinning wheel along the cylindrical member blank until a feeding amount of the shear spinning wheel satisfies a first preset condition, thus obtaining an unsaturated I-bar cylindrical member with an unsaturated I-bar structure.

The circumferential rotation refers to a rotation of the cylindrical member blank 1 occurring with its own axis as a rotation center.

The axial feeding means that after the spinning wheel is sheared into the cylindrical member blank 1, the spinning wheel moves in the axial direction (e.g., the Y direction in FIG. 11) of the cylindrical member blank 1, relative to the cylindrical member blank 1.

The feeding amount may include at least one of a feeding amount of the shear spinning wheel 12 or the flow spinning wheel 13 in an axial direction (e.g., the Y direction in FIG. 11) of the cylindrical member blank 1, a feeding amount of the fractal spinning wheel 14 or the flat spinning wheel 15 in a radial direction (e.g., the Z direction in FIG. 11) of the cylindrical member blank 1, or the like. For more information about the feeding amount, please refer to the previous description.

The first preset condition refers to a condition that a feeding amount of the axial feeding of the shear spinning wheel 12 needs to meet. In some embodiments, the first preset condition may be a first preset range that the feeding amount of the shear spinning wheel 12 needs to satisfy, for example, 5-10 mm, etc. The processor may preset the first preset condition in advance.

The unsaturated I-bar structure 4 refers to the protrusions formed on the surface of the cylindrical member blank 1 after the shear spinning wheel 12 has moved relative to the cylindrical member blank 1.

In some embodiments, the unsaturated I-bar structure 4 may be moved and shaped on the upper shear working surface 121, along a direction radially outward (e.g., in the direction opposite to the Z direction in FIG. 11) from the cylindrical member blank 1. A side surface of the unsaturated I-bar structure 4 in contact with the shear spinning wheel 12 is subjected to relative friction with the shear spinning wheel 12 during the forming process, and compared with the opposite side, the side surface of the unsaturated I-bar structure 4 that contacts the shear spinning wheel 12 has better flatness and surface accuracy.

In some embodiments, after the positioning of the shear spinning wheel 12 is complete, the processor may control the mandrel 11 to rotate at a first preset rotational speed. Simultaneously, the processor controls the shear spinning wheel 12 to feed along the axial direction of the cylindrical member blank 1 at a first preset feeding amount and a first preset feeding speed. For example, the first preset feeding speed may be 80 rpm, 90 rpm, 100 rpm, or other values, the first preset feeding amount may be 6 mm, 6.2 mm, 6.5 mm, or other values, and the first preset feeding speed may be 0.8 mm/s, 1 mm/s, 1.2 mm/s, or other values.

The material in contact with the shear spinning wheel 12 on the cylindrical member blank 1 is influenced by the shear spinning wheel 12 to flow along the axial direction of the cylindrical member blank 1, preparing to form an unsaturated I-bar cylindrical member 3 with an unsaturated I-bar structure 4. The unsaturated I-bar cylindrical member 3 refers to a cylindrical structure with the unsaturated I-bar structure 4.

Operation 130, controlling a working surface of a flow spinning wheel to be in perpendicular contact with a surface of the unsaturated I-bar cylindrical member and controlling the cylindrical member blank to be maintained in a circumferential rotational state.

Figure 8:
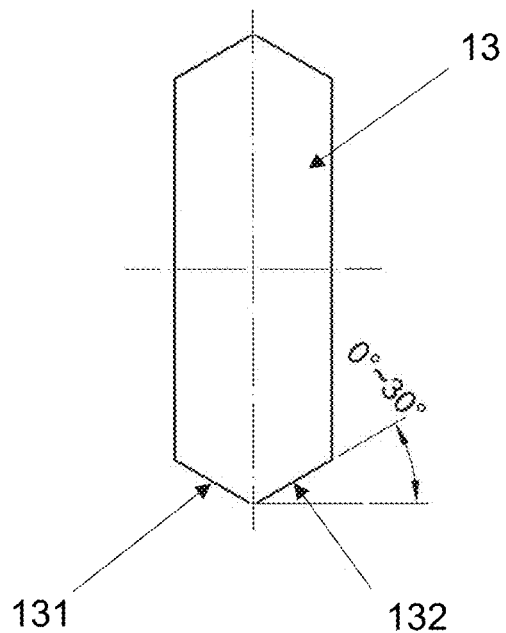
FIG. 8 is a structural diagram illustrating a flow spinning wheel according to some embodiments of the present disclosure.

For more information about the working surface of the flow spinning wheel, please refer to FIG. 8.

The perpendicular contact means that the radial direction (e.g., the Z direction in FIG. 11) of the flow spinning wheel 13 is perpendicular to an axis of the unsaturated I-bar cylindrical member 3. The rotation center of the flow spinning wheel 13 is parallel to the axis of the unsaturated I-bar cylindrical member 3.

Operation 140, controlling the flow spinning wheel to thin one side of the unsaturated I-bar cylindrical member until a wall thickness difference on both sides of the unsaturated I-bar cylindrical member satisfies a preset difference condition, controlling the flow spinning wheel to shape the unsaturated I-bar structure, thus obtaining a saturated I-bar cylindrical member with a saturated I-bar structure.

The saturated I-bar structure 6 is a protrusion formed by shaping an uneven side surface of the unsaturated I-bar structure 4. The saturated I-bar cylindrical member 5 means a cylindrical member having the saturated I-bar structure 6.

"Thinning" refers to the process of using the flow spinning wheel 13 to cut into the unsaturated I-bar cylindrical member 3 and produce relative movement. The flow of a portion of the material on the unsaturated I-bar cylindrical member 3 is caused to occur, resulting in a reduction of a portion of the wall thickness of the unsaturated I-bar cylindrical member 3.

Two sides of the unsaturated I-bar cylindrical member 3 refer to two sides of the unsaturated I-bar structure 4 along the axial direction of the unsaturated I-bar cylindrical member 3. One of the sides of the unsaturated I-bar structure 4 is thinned by the shear spinning wheel 12. The other side of the unsaturated I-bar structure 4 is thinned by the flow spinning wheel 13.

The preset difference condition is a condition associated with the wall thickness on both sides of the unsaturated I-bar cylindrical member 3. In some embodiments, the preset difference condition may include a difference in wall thickness between the two sides of the unsaturated I-bar cylindrical member 3 being less than or equal to a third preset value. The preset difference condition may include a wall thickness of 0 on both sides of the unsaturated I-bar cylindrical member 3. The preset difference condition may be preset in advance.

Shaping refers to the adjustment of the unsaturated I-bar structure 4 by the flow spinning wheel 13. Shaping may include at least one of adjusting the shape, surface accuracy, or the like of the unsaturated I-bar structure 4. The processor may control the flow spinning wheel 13 to compress and rub against the unsaturated I-bar structure 4 as a means of shaping the unsaturated I-bar structure 4.

In some embodiments, after the positioning of the flow spinning wheel 13 is complete, the processor may control the mandrel 11 to rotate at a second preset rotational speed. Simultaneously, the flow spinning wheel 13 is controlled to shear the unsaturated I-bar cylindrical member 3 in a radial direction (e.g., the Z direction in FIG. 11) at a preset first shearing amount, and then to feed the unsaturated I-bar cylindrical member 3 in an axial direction (e.g., the Y direction in FIG. 11) at a second preset feeding amount and at a second preset feeding speed. For example, the second preset rotational speed may be 80 rpm, 90 rpm, 100 rpm, or other values. The first preset shearing amount may be 0.8 mm, 1 mm, or other values. The second preset feeding amount may be 9 mm, 10 mm, 11 mm, or other values. The second preset feeding speed may be 0.8 mm/s, 1 mm/s, 1.2 mm/s, or other values. To ensure the wall thicknesses of the unsaturated I-bar cylindrical member 3 on both sides of the unsaturated I-bar structure 4 are equal.

In some embodiments, the processor may control the flow spinning wheel 13 to feed at a third preset feeding amount, at a third preset feeding speed, along a direction opposite to the axial direction of the unsaturated I-bar cylindrical member 3 (e.g., the direction opposite to the Y-direction in FIG. 11). For example, the third preset feeding amount may be 9 mm, 10 mm, 11 mm, etc. or other values. The third preset feeding speed may be 0.8 mm/s, 1 mm/s, 1.2 mm/s, etc. or other values. Taking the third preset feeding amount of 10.3 mm and the third preset feeding speed of 11 mm/s as an example, the unsaturated I-bar structure 4 is extruded and reshaped under a compressive force of the flow spinning wheel 13 to form one saturated I-bar structure 6. The unsaturated I-bar structure 4 is extruded and shaped under the action of the flow spinning wheel 13 to form a saturated I-bar cylindrical member 5 with a saturated I-bar structure 6.

A bar height (e.g., $h_s$ in FIG. 12) of the saturated I-bar cylindrical member 5 may be 6 mm and a bar width (e.g., $W_s$ in FIG. 12) may be 1 mm. The feeding speed of the flow spinning wheel 13 may be determined based on a dimensional parameter and a flattening degree of the unsaturated I-bar cylindrical member 3. For more information, please refer to FIG. 8.

Operation 150, controlling a fractal working surface of a fractal spinning wheel to be in contact with a top of the saturated I-bar structure, controlling the cylindrical member blank to maintain the circumferential rotation state to control the fractal spinning wheel to perform a radial feeding movement, wherein until a feeding amount of the fractal spinning wheel satisfies a second preset condition, a Y-bar cylindrical member with a Y-bar is obtained, and the fractal spinning wheel is mounted on the spinning wheel stand of the numerically controlled spinning machine.

The fractal working surface of the fractal spinning wheel 14 refers to a circumferential surface of the fractal spinning wheel 14. For more information about the fractal working surface, please refer to the previous description thereof.

The radial feeding refers to a relative movement between the spinning wheel and the protrusion after the spinning wheel comes into contact with the top of the protrusion, specifically, the spinning wheel moving along the radial direction of the unsaturated I-bar cylindrical member (for example, the Z direction in FIG. 11). For example, upon contact of the fractal spinning wheel 14 with the top of the saturated I-bar structure 6, the fractal spinning wheel 14 moves in the radial direction (e.g., the Z-direction in FIG. 11) along the radial direction (e.g., the Z-direction in FIG. 11) of the saturated I-bar cylindrical member 5, relative to the saturated I-bar structure 6.

The second preset condition is a condition that needs to be satisfied for the feeding amount of the radial feeding of the fractal spinning wheel 14. The second preset condition may be that the feeding amount of the fractal spinning wheel 14 satisfies the second preset range. The second preset range may be 1-3 mm, etc.

The Y-bar 8 is a protrusion with a Y-shaped cross-section formed by being truncated by a plane passing through the axis of the saturated I-bar cylindrical member 5.

The Y-bar cylindrical member 7 is a cylinder structure having the Y-bar 8.

In some embodiments, the processor controls the fractal spinning wheel 14 such that its fractal working surface (e.g., a circumferential surface of the fractal spinning wheel 14) contacts the top of the saturated I-bar structure 6.

In some embodiments, the processor may control the mandrel 11 to rotate at a fourth preset speed. At the same time, the fractal spinning wheel 14 may be controlled to feed at a fourth preset feeding amount, at a fourth preset feeding speed, along a radial direction (e.g., the Z direction in FIG. 11) from the saturated I-bar cylindrical member 5. To cause the saturated I-bar structure 6 to be separated from the top by the action of the fractal spinning wheel 14 to form a Y-bar 8. The fourth preset rotational speed may be 80 rpm, 90 rpm, 100 rpm, etc. or other values. The fourth preset feed may be 0.8 mm, 1 mm, 1.2 mm, etc. or other values. The fourth preset feeding speed may be 1.3 mm/s, 1.5 mm/s, 1.8 mm/s, etc. or other values.

Operation 160, the processor controls the working surface of the flat spinning wheel 15 to be in perpendicular contact with the surface of the Y-bar cylindrical member 7, controls the cylindrical member blank (e.g., the Y-bar cylindrical member 7) to maintain a circumferential rotational state, and controls the flat spinning wheel 15 to feed radially along the top of the Y-bar 8 to obtain the T-bar cylindrical member 9.

Figure 6:
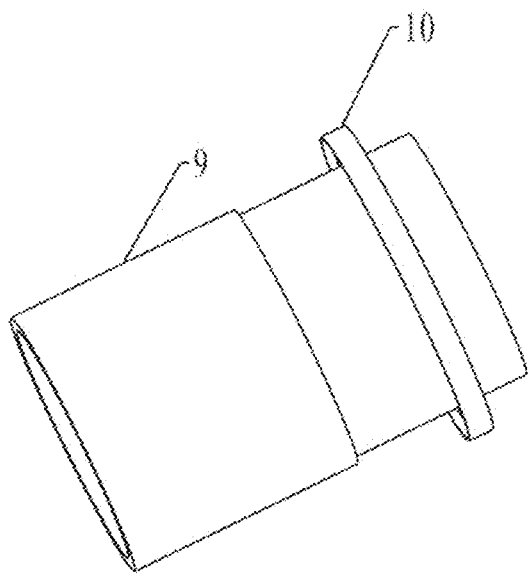
FIG. 6 is a structural diagram illustrating a T-bar cylindrical member according to some embodiments of the present disclosure.

FIG. 6 is a structural diagram illustrating a T-bar cylindrical member according to some embodiments of the present disclosure. The T-bar 10 refers to a protrusion with a T-shaped cross-section formed by being truncated by a plane passing through the axis of the T-bar cylindrical member 9. The T-bar cylindrical member 9 refers to a cylindrical structure having the T-bar 10.

In some embodiments, the processor may control the flat spinning wheel 15 such that the working surface of the flat spinning wheel 15 (e.g., a side surface of the flat spinning wheel 15) is in perpendicular contact with the surface of the Y-bar cylindrical member 7 (e.g., a top of the Y-bar 8).

In some embodiments, the processor may control the mandrel 11 to rotate at a fifth preset speed. At the same time, the flat spinning wheel 15 may be controlled to feed at a fifth preset feeding amount, at a fifth preset feeding speed, along a radial direction (e.g., the Z direction in FIG. 11) with the Y-bar cylindrical member 7. A portion of the structure that causes the Y-bar 8 to be inclined with respect to the axis of the Y-bar cylindrical member 7 is deformed by pressure and gradually becomes parallel to the axis of the Y-bar cylindrical member 7. Eventually, the T-bar 10 is formed. The fifth preset rotational speed may be 80 rpm, 90 rpm, 100 rpm, or the like. The fifth preset feed may be 1.8 mm, 2 mm, 2.2 mm, or the like. The fifth preset feeding speed may be 0.8 mm/s, 1 mm/s, 1.2 mm/s, or the like.

In some embodiments, the T-bar 10 is processed. The processor may control the mandrel 11 to stop rotating. and the flat spinning wheel 15 to exit in a radial reverse direction (e.g., a direction opposite to the Z direction in FIG. 11). The processor is controlling the spinning wheel stand away from the mandrel 11. The T-bar cylindrical member 9 may be manually removed.

In some embodiments, an outer diameter of the T-bar cylindrical member 9 (e.g., D1 in FIG. 12) may be 198 mm, an inner diameter (e.g., d in FIG. 12) may be 180 mm, a height of the T-bar (e.g., FIG. 11) (e.g., H in FIG. 12) may be 4 mm, a width (e.g., W in FIG. 12) may be 5 mm, a web thickness (e.g., $t_1$ in FIG. 12) may be 1 mm, and a thickness of the wing plate (e.g., $t_2$ in FIG. 12) may be 0.5 mm.

In some embodiments, the spinning wheel forming angle of the flat spinning wheel satisfies the third forming angle condition, and the difference between the feeding amount of the flat spinning wheel and the feeding amount of the fractal spinning wheel satisfies the fifth preset condition.

The spinning wheel forming angle of the flat spinning wheel refers to the angle of the portion of the flat spinning wheel that is in contact with the cylindrical member blank.

The third forming angle condition is a condition to be satisfied for a machining angle of the preset spinning wheel forming angle of the flat spinning wheel.

As shown in FIG. 10, the preset machining angle of the spinning wheel forming angle of the flat spinning wheel may be 0°, etc. The processor may preset the third forming angle condition according to the actual demand.

The fifth preset condition is a correspondence that needs to be maintained between the feeding amount of the flat spinning wheel and the feeding amount of the fractal spinning wheel during the machining of the flat spinning wheel. The fifth preset condition may be that the difference between the feeding amount of the flat spinning wheel and the feeding amount of the fractal spinning wheel is 0 (i.e., the feeding amount of the flat spinning wheel is equal to the feeding amount of the fractal spinning wheel).

By setting the machining angle of the flat spinning wheel and the conditions to be met by the difference between the feeding amount of the flat spinning wheel and the feeding amount of the fractal spinning wheel, the machining accuracy of the flat spinning wheel can be improved, thereby enhancing the quality of the quality of the T-bar cylindrical member.

In some embodiments of the present disclosure, by adopting a structure such as a shear spinning wheel, a flow spinning wheel, a fractal spinning wheel, a flat spinning wheel or the like to process a cylindrical member blank, a portion of the material of the cylindrical member blank is made to flow and undergo plastic deformation, avoiding the introduction of external structures such as rivets and welds into the final molded product, ensuring the integrity of the product, and improving the forming accuracy of the product. A dimension of the product may be controlled by the process parameters of the shear spinning wheel, the flow spinning wheel, the fractal spinning wheel, the flat spinning wheel, and other structures, so that the dimension of the product is no longer constrained by the model, enlarging the scope of application of this forming method. This method is based on the spinning forming process of the cylindrical member and the multi-directional coordinated loading of the spinning wheel. By combining various local shear deformation methods such as shear forming, flow spinning, and fractal spinning, it successively forms I-bar structure and T-bar structure through the axial and radial loading of the spinning wheel. This realizes the staged shear deformation of the cylindrical member blank, ultimately achieving the integrated and staged shear forming of the T-bar cylindrical member.

Figure 7:
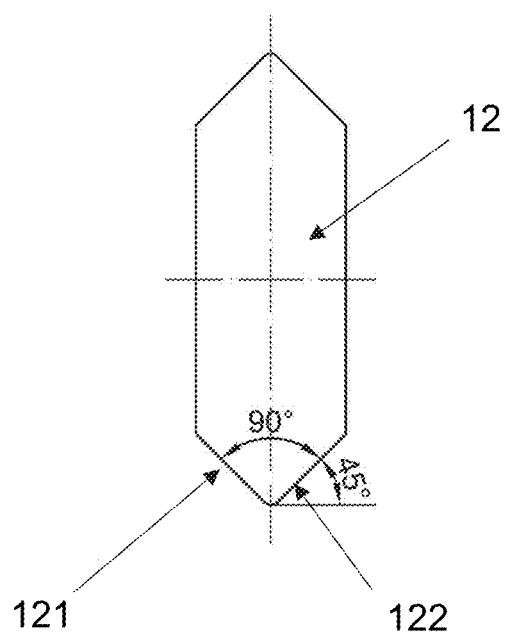
FIG. 7 is a structural diagram illustrating a shear spinning wheel according to some embodiments of the present disclosure.

FIG. 7 is a structural diagram illustrating a shear spinning wheel according to some embodiments of the present disclosure.

As shown in FIG. 7, the shear spinning wheel 12 includes an upper shear working surface 121 and a lower shear working surface 122.

The upper shear working surface 121 is used for extruding a portion of the material on the outer surface of the cylindrical member blank 1, which primarily serves to shape the portion of the material on the outer surface of the cylindrical member blank 1. In some embodiments, the upper shear working surface 121 may be a conical surface. A bus of the upper shear working surface 121 is coextensive with one of the diameters of the cylindrical member blank 1. The extruded portion of material may form a protrusion outwardly along the radial direction of the cylindrical member blank 1 (e.g., the direction opposite to the Z direction in FIG. 11). The protrusion may include an I-bar.

The lower shear working surface 122 is used for extruding a thinned outer surface of the cylindrical member blank 1 after the material flow on a portion of the outer surface of the cylindrical member blank 1, and may improve the surface accuracy of the thinned outer surface of the cylindrical member blank 1. The lower shear working surface 122 may be a conical surface. The bus of the lower shear working surface 122 is parallel to the axis of the cylindrical member blank 1, and the bus of the lower shear working surface 122 is in contact with the outer surface of the cylindrical member blank 1.

In some embodiments, the upper shear working surface 121 and the lower shear working surface 122 may be coaxial. The upper shear working surface 121 and the lower shear working surface 122 are connected to each other by a transition fillet.

The transition fillet refers to a rounded corner where two adjacent surfaces meet. Using the transition fillet may increase the strength of the joint, prevent the occurrence of stress concentration, and help prevent damage to the joint. An angle between the upper shear working surface 121 and the lower shear working surface 122 satisfies an angle condition, and a radius of the spinning wheel fillet of the transition fillet satisfies a first radius condition.

The angle condition is a condition that controls a size of the angle of between the upper shear working surface 121 and the lower shear working surface 122. The angle condition may include an angle between the upper shear working surface 121 and the lower shear working surface 122 ranging from 80°-100°. That is, an angle between the bus of the upper shear working surface 121 and the bus of the lower shear working surface 122 may be 80°-100°. The angle condition may include an angle of 90° between the upper shear working surface 121 and the lower shear working surface 122.

In some embodiments, the angle between the bus of the upper shear working surface 121 and the axis of the shear spinning wheel 12 may be 45°. The angle between the bus of the lower shear working surface 122 and the axis of the shear spinning wheel 12 may be 45°. The angle between the axis of the shear spinning wheel 12 and the axis of the cylindrical member blank 1 may be 45°.

The spinning wheel fillet is a fillet obtained by truncating the transition fillet through a plane passing through the axis of the shear spinning wheel 12. That is, the fillet located between the bus of the upper shear working surface 121 and the bus of the lower shear working surface 122.

In some embodiments, the radius of the spinning wheel fillet of the transition fillet satisfies the first radius condition.

The first radius condition is a condition that controls the radius of the spinning wheel fillet of the spinning wheel. The first radius condition may be that the radius of the spinning wheel fillet is within a first radius. The first radius range may be 0.5-3 mm. The manufacturer may produce a corresponding shear spinning wheel 12 based on the first radius condition.

In some embodiments of the present disclosure, by adopting the transition fillet to connect the upper shear working surface and the lower shear working surface, it is possible to provide a protective effect for the connection between the upper shear working surface and the lower shear working surface, which is helpful to prevent the upper shear working surface and the lower shear working surface from being damaged at the connection. After the shear spinning wheel finishes extruding a portion of the material of the cylindrical member blank, the spinning wheel fillet may be formed between a protrusion formed on the cylindrical member blank and the remaining outer surface of the cylindrical member blank to avoid a stress concentration phenomenon at the connection between the protrusion and the cylindrical member blank. This prevents damage to the connection between the protrusion and the cylindrical member blank.

FIG. 8 is a structural diagram illustrating a flow spinning wheel according to some embodiments of the present disclosure.

In some embodiments, the flow spinning wheel 13 is a first biconical angle spinning wheel. The first biconical angle spinning wheel means that the working surface of the flow spinning wheel 13 including two symmetrically arranged conical surfaces or at least a portion of the conical surfaces.

In some embodiments, the working surface of the flow spinning wheel 13 is a surface of the flow spinning wheel 13 that causes extrusion of the outer surface of the cylindrical member blank 1. The working surface of the flow spinning wheel 13 includes a first flow surface 131 and a second flow surface 132. The first flow surface 131 and the second flow surface 132 are conical surfaces or at least portions of conical surfaces respectively.

The first flow surface 131 is configured to extrude a portion of the material on the outer surface of the cylindrical member blank 1. Primarily, it serves to make an unthinned portion on the outer surface of the cylindrical member blank 1. The unthinned portion may include at least a portion of the cylindrical member blank 1, located on a side of the protrusion facing the Y direction. The first flow surface 131 may be a conical surface.

The second flow surface 132 is used to extrude a surface formed after thinning the cylindrical member blank 1 by the first flow surface 131. An end surface of the flow spinning wheel 13 near the protrusion (for example, an undersaturated I-bar) may be used to extrude the protrusion, causing the surface of the protrusion adjacent to the flow spinning wheel 13 to have relative friction with the flow spinning wheel 13, thereby enabling the protrusion to be shaped.

In some embodiments, the first flow surface 131 and the second flow surface 132 may be coaxial.

The spinning wheel forming angle refers to an angle between a normal of the first flow surface 131 or a normal of the second flow surface 132 and the axis of the cylindrical member blank 1 when the flow spinning wheel 13 acts on the cylindrical member blank 1.

In some embodiments, the spinning wheel forming angle may be a stage-varying sequence data.

The sequence data is a sequence of multiple spinning wheel forming angles.

The stage change may include a change that occur at an interval of time and/or at an interval of distance. The flow spinning wheel 13 may be in the first stage when it moves along the axial direction (e.g., the Y-direction in FIG. 11) of the cylindrical member blank 1. The flow spinning wheel 13 may be in the second stage when it moves in the axial reverse direction (e.g., the direction opposite to the Y-direction in FIG. 11) along the cylindrical member blank 1. At the second stage, the spinning wheel forming angle of the flow spinning wheel 13 may gradually increase.

In some embodiments, the feeding speed of the flow spinning wheel 13 is determined based on the dimensional parameter of the unsaturated I-bar cylindrical member and the flattening degree. The processor may determine the feeding speed of the flow spinning wheel 13 based on the dimensional parameter and the flattening degree of the unsaturated I-bar cylindrical member 3.

In some embodiments, the feeding speed of the flow spinning wheel 13 may be a feeding speed of the second stage, including the feeding speed of the flow spinning wheel 13 as it moves toward the unsaturated I-bar cylindrical member.

The dimensional parameter of the unsaturated I-bar cylindrical member 3 refers to a parameter related to the dimension of the unsaturated I-bar cylindrical member 3. In some embodiments, the dimensional parameter may include a residual feeding amount and a total feeding amount.

The total feeding amount refers to a distance of relative movement that needs to occur between the flow spinning wheel 13 and the unsaturated I-bar cylindrical member 3 during the second stage. The total feeding amount may be manually entered or obtained from historical data.

The residual feeding amount is a difference between the total feeding amount and a distance traveled by the flow spinning wheel 13 after it has moved a certain distance during the second stage. In some embodiments, the processor may determine the residual feeding amount in a variety of ways. For example, the processor may determine the residual feeding amount using sensor detection, or by calculating using a first preset algorithm, or the like. For example, the sensor may include a photoelectric sensor or the like. The residual feeding amount may be negatively correlated with a current feeding speed of the flow spinning wheel and a movement time of the flow spinning wheel 13. The first preset algorithm may include equation (1):

$$f_n = f_m - (v_m \times t_m) \qquad (1)$$

Where $f_n$ is the residual feeding amount. $f_m$ is the total feeding amount. $v_m$ is the current feeding speed of the flow spinning wheel, i.e., a speed corresponding to a distance the flow spinning wheel has already moved. $t_m$ is the movement time of the flow spinning wheel.

In some embodiments, the processor may determine the feeding speed of the flow spinning wheel in a variety of ways based on the dimensional parameter of the unsaturated I-bar cylindrical member 3 and the flattening degree. The feeding speed of the flow spinning wheel may be positively correlated to the residual feeding amount and a feeding resistance factor, and negatively correlated to the total feeding amount and the flattening degree.

In some embodiments, the processor may calculate the feeding speed for the flow spinning wheel 13 based on a second preset algorithm. wherein the second preset algorithm may include equation (2):

$$v_n = v_0 \times ((f_n \div f_m) + v_j) \times (\exp(-p)) \times F_r \qquad (2)$$

Wherein, $v_n$ is the feeding speed of the flow spinning wheel 13. $v_0$ is the preset feeding speed of the flow spinning wheel 13. $f_n$ is the residual feeding amount. $f_m$ is the total feeding amount. $v_j$ is the reference speed of the flow spinning wheel 13. exp is the natural exponential function. p is the flattening degree. $F_r$ is the feeding resistance factor.

The feeding resistance factor is a parameter that correlates with the resistance that the flow spinning wheel 13 is subjected to during the second stage of feed. The feeding resistance factor may be negatively correlated with the resistance to which the flow spinning wheel 13 is subjected. The feeding resistance factor may be a fourth preset value close to 0, for example, 0.3, 0.5, or the like.

The reference speed is a fifth preset value greater than zero. Avoiding the flow spinning wheel 13 approaching the unsaturated I-bar cylindrical member with a reduced feeding speed of 0, preventing the flow spinning wheel 13 from being unable to apply pressure to the unsaturated I-bar cylindrical member.

The preset feeding speed of the flow spinning wheel 13 is a sixth preset value. The preset feeding speed of the flow spinning wheel 13 may be a feeding speed of the flow spinning wheel 13 in the first stage. The feeding resistance factor, the reference speed, and the preset feeding speed of the flow spinning wheel 13 may be manually inputted or obtained from historical data.

By controlling the spinning wheel forming angle and the feeding speed, it is possible to automate the control and improve the quality of the unsaturated I-bar molding. By controlling the spinning wheel forming angle and the feeding speed, automated control may be achieved, improving the forming quality of undersaturated I-bar. By adjusting the spinning wheel forming angle of the flow spinning wheel in the feeding process in the second stage, it is possible to prevent the flow spinning wheel from accidentally touching the unsaturated I-bar, thereby ensuring the quality of the unsaturated I-bar forming. Determining the feeding speed takes into account the resistance of the flow spinning wheel and the distance between the flow spinning wheel and the unsaturated I-bar, and thus dynamically adjusts the feeding speed of the flow spinning wheel to avoid continuous and rapid extrusion of the unsaturated I-bar, preventing unpredictable deformation and indentation of the unsaturated I-bar, and avoiding any adverse effects on processing quality and efficiency.

In some embodiments, the processor may determine the spinning wheel forming angle based on the residual feeding amount and the feeding speed of the flow spinning wheel in a variety of ways, e.g., by calculating by a third preset algorithm or the like. The spinning wheel forming angle may be negatively correlated to the residual feeding amount, positively correlated to the preset datum and the total feeding amount. wherein the third preset algorithm may include equation (3):

$$\varphi = 30° \times (1 - (f_n - y_j) \div f_m) \quad (3)$$

Wherein, φ is the spinning wheel forming angle. $y_j$ is the preset datum. The preset baseline amount is the seventh preset value. The processor may determine the preset datum based on the height of the unsaturated I-bar. For example, calculated by a fourth preset algorithm, or the like. The preset datum amount may be positively correlated to the height of the unsaturated I-bar. Wherein, the fourth preset algorithm may include equation (4):

$$y_j = 1.2 \times h_b \div \sqrt{3} \quad (4)$$

Where $y_j$ is the preset datum amount. $h_b$ is the height of the unsaturated I-bar. By employing the preset datum amount, the flow spinning wheel 13 may be prevented from accidentally colliding with the unsaturated I-bar when the spinning wheel forming angle of the flow spinning wheel 13 changes.

In some embodiments, the feeding speed of the flow spinning wheel 13 is negatively correlated with a feeding resistance of the spinning wheel stand.

The feeding resistance of the spinning wheel stand is a resistance to the spinning wheel stand as it moves. The processor may obtain the feeding resistance of the spinning wheel stand in a variety of ways, such as, for example, controlling sensor detection.

The processor may dynamically adjust the size of the spinning wheel forming angle based on the residual feeding amount and the feeding speed of the flow spinning wheel, which is conducive to reducing the resistance of the flow spinning wheel in the moving process.

In some embodiments, the spinning wheel forming angle of the flow spinning wheel 13 satisfies the first forming angle condition.

The spinning wheel forming angle of the flow spinning wheel 13 is an angle between the working surface of the flow spinning wheel 13 and the cylindrical member blank 1. That is, the angle between the bus of the first flow surface 131, and the bus of the second flow surface 132, respectively, and the axis of the cylindrical member blank 1. By varying the angle between the axes of the flow spinning wheel 13 and the axes of the cylindrical member blank 1, the magnitude of the spinning wheel forming angle of the flow spinning wheel 13 can be varied. By adjusting the angle between the axis of the flow spinning wheel 13 and the axis of the cylindrical member blank 1, the size of the forming angle of the flow spinning wheel 13 may be changed.

The first forming angle condition refers to a condition configured to control the spinning wheel forming angle of the flow spinning wheel. The first forming angle condition may be a first angle range that the spinning wheel forming angle of the flow spinning wheel needs to meet. Wherein the first angle range may be 0-30°.

The radius of the spinning wheel fillet of the flow spinning wheel 13 satisfies a second radius condition.

The second radius condition means that the radius of the spinning wheel fillet of the spinning wheel of the flow spinning wheel 13 is within a second radius range. The second radius range may be 0.5-3 mm, etc.

The difference between a thinning amount of the flow spinning wheel 13 and the shearing amount of the shear spinning wheel 12 satisfies the fourth preset condition.

The thinning amount is a depth at which the flow spinning wheel 13 cuts into the cylindrical member blank 1 when the flow spinning wheel 13 is thinning the cylindrical member blank 1.

In some embodiments, the fourth preset condition may be that the difference between the thinning amount of the flow spinning wheel 13 and the shearing amount of the shear spinning wheel 12 meets a fourth preset range. The fourth preset range may be 0-1 mm, etc.

By using the flow spinning wheel to reduce the thickness of the unthinned section of the cylindrical member blank, the wall thickness on both sides of the I-bar may be maintained uniformly to meet production requirements. Shaping the unsaturated I-bar using the flow spinning wheel also improves the forming accuracy of the I-bar. And it corrects the unevenness of the side surface of the unsaturated I-bar caused by the flow of material when the shear spinning wheel compresses the material.

In some embodiments, the processor may obtain spinning wheel positioning information of the flow spinning wheel via the photoelectric sensor.

The photoelectric sensor may utilize the photoelectric effect to detect data such as position and distance. The sensor may be communicatively connected to a processor, enabling the processor to receive signals detected by the photoelectric sensor. The photoelectric sensor may be installed on the stand of the numerically controlled spinning machine.

The spinning wheel positioning information refers to information related to a relative position between the flow spinning wheel 13 and the cylindrical member blank 1. The spinning wheel positioning information may be detected through the photoelectric sensor. The spinning wheel positioning information may include coordinate data of the flow spinning wheel 13. The processor may establish a coordinate system based on the axis of the mandrel 11. For example, the axis of the mandrel 11 may be taken as the X-coordinate, with one of the end points of the mandrel 11 as the origin. A line perpendicular to the axis of the mandrel in a horizontal plane and passing through the origin is the Y-coordinate, while a line perpendicular to both the X-coordinate and Y-coordinate and passing through the origin is the Z-coordinate.

In some embodiments, the processor may evaluate a positioning accuracy of the flow spinning wheel based on the spinning wheel positioning information and the flattening degree of the undersaturated I-bar cylindrical member.

The flattening degree refers to a degree of unevenness on the surface of the undersaturated I-bar cylindrical member. The flattening degree may be represented by numerical values, such as 0-10. The lower the numerical value is, the better the flattening degree is. The processor may determine the flattening degree by controlling a detection device, such as an optical detection device.

In some embodiments, the detection device may be installed on the stand of the numerically controlled spinning machine. The processor may control the optical detection device to capture a monitoring image of the undersaturated I-bar cylindrical member, analyze the image, and determine the flattening degree of the undersaturated I-bar cylindrical member. The monitoring image refer to an image captured by the optical detection device related to the surface of the undersaturated I-bar cylindrical member.

In some embodiments, the processor may determine the flattening degree of the monitoring image based on a comparison between the monitoring image and a standard positioning image. For example, the processor may compare the similarity between the monitoring image and the standard positioning image, and the higher the similarity is, the better the flattening degree of the monitoring image is.

The standard positioning image refers to an image that may be used as a reference standard. The flattening degree of the standard positioning image may be zero, for example.

The positioning accuracy refers to relevant data reflecting the degree of accuracy in the relative position between the flow spinning wheel 13 and the cylindrical member blank 1. The positioning accuracy may indicate the processing quality of the flow spinning wheel 13 on the cylindrical member blank 1. A higher positioning accuracy represents a higher processing quality. The positioning accuracy may be expressed as a numerical value between 0 and 1. A larger numerical value indicates better positioning accuracy and a more precise positioning of the flow spinning wheel 13.

In some embodiments, the processor may determine the positioning accuracy through a positioning model.

The positioning model refers to a model used to determine the positioning accuracy. The positioning model may be a machine learning model. It may include a flattening layer and an accuracy layer. For example, the flattening layer may be a convolutional neural network, while the accuracy layer may be a recurrent neural network.

In some embodiments, an input of the flattening layer may include the monitoring image and the standard positioning image, and an output may include the flattening degree. An input of the accuracy layer may include the flattening degree and the spinning wheel positioning information, and an output may include the positioning accuracy.

For more information about the monitoring image, the standard positioning image, the flattening degree, and the spinning wheel positioning information, please refer to the previous sections.

In some embodiments, the flattening layer may be trained using multiple first training samples with first labels. The processor may input the multiple first training samples with first labels into an initial flattening layer, construct a loss function based on the first labels and the results from the initial flattening layer, and iteratively update parameters of the initial flattening layer based on the loss function. The training of the model is complete when the loss function of the initial flattening layer satisfies a preset condition, resulting in a trained flattening layer. The preset condition may include a convergence of the loss function, a number of iterations reaching a threshold, etc.

In some embodiments, each group of first training samples may include a sample monitoring image corresponding to a sample cylindrical member and a sample standard positioning image. The first label represents the flattening degree corresponding to the sample monitoring image of the sample cylindrical member. The processor may determine the first training samples through various methods, such as retrieving them from historical processing data. The historical processing data refers to data related to the processing of T-bar cylindrical members generated during historical periods. Each processed T-bar cylindrical member corresponds to a sample cylindrical member. The first labels are obtained through manual annotation.

In some embodiments, the processor may determine the first label corresponding to a sample cylindrical member based on a difference degree of a target region calculated from the sample monitoring image and the sample standard positioning image of the sample cylindrical member.

The target region refers to a region in the sample monitoring image and the sample standard positioning image where the undersaturated I-bar of the sample cylindrical member is located. The processor may calculate a maximum number of grid cells deviated by the undersaturated I-bar in the target region of the sample monitoring image. Taking the undersaturated I-bar in the standard positioning image as a reference standard, the maximum number of deviated grid cells refers to the distance, expressed in the number of grid cells, between the grid cell with the largest deviation in the sample monitoring image's undersaturated I-bar and the corresponding grid cell in the reference standard. For example, if the grid cell with the largest deviation in the undersaturated I-bar of the sample monitoring image is one grid cell away from the reference standard, the number of grid cells is 1.

In some embodiments, the processor may calculate a ratio of the maximum number of deviated grid cells to a number of grid cells occupied by the undersaturated I-bar. For example, if the maximum number of deviated grid cells is 1, and the number of grid cells occupied by the undersaturated I-bar is 5, the ratio would be 0.2. A higher ratio indicates a greater difference between the undersaturated I-bar in the sample monitoring image and the one in the sample standard positioning image, leading to a higher numerical value and poorer flatness.

In some embodiments, a range of the ratio of the maximum number of deviated grid cells to the number of grid cells occupied by the undersaturated I-bar may be 0-1. This range corresponds to a numerical value of the flattening degree. The processor may calculate the numerical value of the flattening degree based on this ratio. For example, the numerical value of the flattening degree may be calculated as the ratio multiplied by 10. The processor may then assign the numerical value of the flattening degree corresponding to the sample cylindrical member as the first label for that sample.

In some embodiments, the processor may determine the target region through various methods, such as image recognition of the sample monitoring image and the sample standard positioning image, or by identifying coordinate points, or at least one of these methods.

In some embodiments, the accuracy layer may be trained using multiple second training samples with second labels. The training process of the accuracy layer is similar to the training process of the flattening layer, and may refer to the relevant descriptions provided earlier.

In some embodiments, each set of second training samples may include sample spinning wheel positioning information and sample flattening degree corresponding to a sample cylindrical member. The second labels represent the positioning accuracy of the second training samples. The processor may determine the second training samples and the second labels from historical processing data.

In some embodiments, the processor may determine the second label for a sample cylindrical member based on a degree of symmetry in the historical processing data corresponding to that sample. The second label may be a numerical value between 0 and 1.

In some embodiments, the second label corresponds to the degree of symmetry in the historical processing data. For example, when the degree of symmetry of a sample cylindrical member is 1, the second label corresponding to that sample is 1. Conversely, if the degree of symmetry is 0, the second label is 0. The degree of symmetry reflects the symmetry of the two wings of the Y-bar processed by the fractal spinning wheel. For more information about the degree of symmetry, please refer to the following sections.

In some embodiments, the processor may obtain the second training samples and second labels for the accuracy layer based on a trained appearance model. For example, the processor may process the historical processing data corresponding to the sample cylindrical member using the appearance model, output an appearance structural feature of the sample, and screen out positive and negative samples for the second training samples of the accuracy layer. The processor then uses the positive and negative samples to form the second training samples and trains the accuracy layer accordingly. The positive samples refer to samples where the degree of symmetry and tilt of the sample cylindrical member meet the requirements, such as both being less than 0.2. The negative samples, on the other hand, refer to samples that do not meet the requirements for symmetry and tilt. For more information about the degree of symmetry, tilt, and the appearance model, please refer to the relevant descriptions in the following sections.

In some embodiments, the processor may determine a positioning position of the flow spinning wheel based on the positioning accuracy, for example, by using a fifth preset algorithm for calculation. The positioning position may be positively correlated with the positioning accuracy. Specifically, the fifth preset algorithm may include equation (5):

$$DW = DW_y + DW_j \times A \quad (5)$$

Where, DW represents the positioning position. $DW_y$ is the preset positioning position. $DW_j$ stands for the positioning accuracy. A is a coefficient, which is an eighth preset value. The preset positioning position refers to a predefined positioning position of the flow spinning wheel and may include pre-set coordinates. The processor may determine the coefficient A and the preset positioning position based on historical data, manual input, or other methods.

When the shear spinning wheel is forming an underfilled I-shaped rib, it may cause unevenness on the other side of the undersaturated I-bar. When the subsequent flow spinning wheel is positioned on an uneven side of the undersaturated I-bar, it may accidentally collide with the bar. By using the positioning model to evaluate the positioning accuracy and adjusting the positioning position of the flow spinning wheel based on the positioning accuracy, the issue of accidental collisions may be avoided, ensuring the quality of the processing.

In some embodiments, a rotational speed range of the mandrel is a preset speed range, the feeding speed range of the shear spinning wheel is a first speed range, the feeding speed range of the flow spinning wheel is a second speed range, the feeding speed range of the fractal spinning wheel is a third speed range, and the feeding speed range of the flat spinning wheel is a fourth speed range.

The preset speed range refers to a pre-set range of values for the rotational speed of the mandrel, for example, 30-180 rpm, etc.

The first speed range refers to a preset feed speed range of the shear spinning wheel, for example, 0.5-mm/s, etc.

The second speed range refers to a preset feed speed range of the flow spinning wheel, for example, 0.3-3 mm/s, etc.

The third speed range refers to a preset feed speed range of the fractal spinning wheel, for example, 0.5-2.5 mm/s, etc.

The fourth speed range refers to a preset feed speed range of the flat spinning wheel, for example, 0.5-2.5 mm/s, etc.

By maintaining the rotational speed of the mandrel within the preset speed range and the feeding speed of each spinning wheel within their respective speed ranges, the stability and safety of the processing process may be maintained, thereby improving the quality of the processing.

In some embodiments, the processor may adjust the rotational speed of the mandrel based on the feeding resistance of the spinning wheel stand, which is obtained through a pressure sensor installed on the spinning wheel stand.

The feeding resistance of the spinning wheel stand refers to a resistance value encountered by the spinning wheel stand during the moving and processing process. The processor may obtain the feeding resistance of the spinning wheel stand based on the pressure sensor deployed on the spinning wheel stand.

In some embodiments, the processor may adjust the rotational speed of the mandrel based on the feeding resistance of the spinning wheel stand. For example, when the feeding resistance of the spinning wheel stand is higher, the corresponding rotational speed of the mandrel is also higher. When adjusting the rotational speed of the mandrel, the processor always maintains it within the preset speed range of the mandrel to ensure safe rotation of the mandrel and, consequently, a stable processing process.

In some embodiments, the preset safe range refers to a speed range that allows the mandrel to rotate safely.

The pressure sensor is a device used to obtain the feeding resistance of the spinning wheel stand. The pressure sensor may include a resistance strain gauge pressure sensor, a capacitive strain gauge pressure sensor, etc. For example, during the spinning process, when the spinning wheel stand encounters feeding resistance, the resistance strain gauge pressure sensor installed on the spinning wheel stand may deform, resulting in a change in its resistance value. This change in resistance value may be converted into an electrical signal by the internal circuitry of the sensor and output. The processor may analyze this electrical signal using a preset algorithm to obtain the magnitude of the feeding resistance on the spinning wheel stand.

In some embodiments, the pressure sensor may periodically send and receive signals to and from the processor, and the processor may also actively control the pressure sensor to obtain a pressure signal value.

In some embodiments, by introducing the pressure sensor to monitor the feeding resistance of the spinning wheel stand in real-time and adjusting the rotational speed of the mandrel accordingly, the forming accuracy of each spinning wheel during the forming process may be improved, optimizing production efficiency.

In some embodiments, the rotational speed of the mandrel corresponds to a first speed during the first processing stage and a second speed during the second processing stage. The first speed and the second speed are determined based on the feed speed of the spinning wheel stand and the preset mandrel speed.

The processing stage refers to a stage in the progressive shearing and forming process of T-bar cylindrical member. The stages may include processing stages during the shear spinning wheel process, the flow spinning wheel process, the fractal spinning wheel process, and the flat spinning wheel process. Each of these processes may include at least one processing stage. For example, the flow spinning wheel process may include multiple stages such as pressing down, moving left, and moving right. The first processing stage and the second processing stage refer to any two distinct processing stages during the entire processing process. The first speed and the second speed have different values.

The preset mandrel speed refers to a preset speed range of the mandrel. Based on the category of the current processing stage, the processor may obtain a corresponding preset mandrel speed for the current stage by querying a preset mandrel speed relationship table. Here, the preset processing stage coefficient relationship table refers to a data table that has been pre-constructed to represent the relationship between the preset mandrel speed and the processing stage. For example, the preset processing stage coefficient relationship table has two columns, corresponding to: the processing stage (e.g., the first processing stage) and the preset mandrel speed.

In some embodiments, different rotational speeds of the mandrel are required to match the different feeding speeds during the shear spinning wheel process, the flow spinning wheel process, the fractal spinning wheel process, and the flat spinning wheel process.

In some embodiments, the processor may obtain the rotational speed of the mandrel based on the preset mandrel speed, the current feeding speed (e.g., the feeding speed of the current shear spinning wheel), and the processing stage coefficient.

In some embodiments, the rotational speed of the mandrel is positively correlated with the preset mandrel speed, the current feeding speed, and the processing stage coefficient. For example, the processor may calculate the rotational speed of the mandrel using a sixth preset algorithm, which may include equation (6):

$$v_{xm} = v_{xy} \times v_d \times J_d \quad (6)$$

wherein, $v_{xm}$ represents the rotational speed of the mandrel. $v_{xy}$ represents the preset mandrel speed. $v_d$ represents the current feeding speed. $J_d$ represents the processing stage coefficient.

In some embodiments, the processor may adjust the processing stage coefficient based on the category of the current processing stage (e.g., the shear spinning wheel).

In some embodiments, the processor may obtain the processing stage coefficient corresponding to the current stage by querying a preset processing stage coefficient relationship table based on the category of the current processing stage. Here, the preset processing stage coefficient relationship table refers to a data table that has been pre-constructed to store the relationship between processing stage coefficients and processing stages. For example, the preset processing stage coefficient relationship table has two columns, corresponding to: processing stage and processing stage coefficient.

In some embodiments of the present disclosure, by dynamically adjusting the mandrel speed based on the current feeding speed of the spinning wheel, the preset mandrel speed, and the processing stage coefficient, it may ensure that the relative speed between the spinning wheel and the workpiece remains stable during the spinning process, thus reducing processing errors caused by speed mismatch and improving the processing accuracy of the workpiece.

In some embodiments, the processor may obtain the appearance structural feature of the Y-bar cylindrical member through an optical detection device.

The appearance structural feature refers to data related to an exterior appearance of the Y-bar cylindrical member. The feature mat includes symmetry and inclination.

The symmetry refers to a degree of symmetry between the two wings of the Y-bar. For example, after truncating the Y-bar cylindrical member with a plane passing through its axis, the symmetry of the two wings of the Y-bar relative to a line perpendicular to the axis of the Y-bar cylindrical member in the resulting cross-section may be measured. The symmetry may be expressed by a numerical value, such as a value between 0 and 1, where a lower value indicates better symmetry, i.e., the two wings of the Y-bar are more symmetrical.

The inclination refers to a degree of perpendicularity between a web of the Y-bar and an outer wall of the Y-bar cylindrical member. For example, when the Y-bar cylindrical member is intercepted by a plane passing through its axis, the resulting cross-section shows the degree of perpendicularity of the web of the Y-bar relative to the outer surface of the Y-bar cylindrical member. The inclination may be expressed numerically, for example, a value between 0 and 1, where a lower value indicates better inclination, i.e., an angle between the web of the Y-bar and the outer wall of the Y-bar cylindrical member is closer to 90°.

In some embodiments, the optical inspection device may include at least two optical cameras, among which one optical camera may be installed on the numerically controlled spinning machine and positioned in front of the mandrel 11, meaning that the detection direction of the optical camera is directly facing the axis of the mandrel 11. The optical camera may capture an axial image of the Y-bar cylindrical member along its axial direction (e.g., the Y direction in FIG. 11).

In some embodiments, one of the optical cameras may be installed on the numerically controlled spinning machine and positioned on the side of the mandrel 11, meaning that the detection direction of the optical camera is perpendicular to the axis of the mandrel 11. The optical camera may capture a side image of the Y-bar cylindrical member along its radial direction (e.g., the Z direction in FIG. 11).

In some embodiments, the optical inspection device may be movably and/or rotatably installed on the numerically controlled spinning machine. This allows for the adjustment of a distance and/or an angle between the detection direction of the optical inspection device and the mandrel 11, thus increasing a range and an angle of photography.

In some embodiments, the processor may obtain the appearance structural feature through grayscale processing based on the axial image and the side image. For example, the axial image and the side image are compared with their corresponding standard flat images respectively to determine the similarity between the axial/side images and the standard flat images. The higher the similarity is, the better the symmetry and inclination is, and the corresponding numerical value will be smaller.

The standard flat images refer to images that may be used as reference standards. The standard flat images may correspond to the axial image and the side image respectively. The processor may determine the standard flat images through various methods, such as obtaining manual inputs.

In some embodiments, the processor may determine the appearance structural feature through an appearance model based on the side image, the axial image, and the standard flat images.

The appearance model refers to a model used to determine the appearance structural feature. The appearance model is a machine learning model.

In some embodiments, an input of the appearance model may include the side image, the axial image, and the standard flat images, and an output may include the appearance structural feature.

In some embodiments, the appearance model may be trained using multiple third training samples with third labels. The training process of the appearance model is similar to the training process of the flat layer, and for more information, please refer to the relevant descriptions above.

In some embodiments, the third training samples may include sample side images, sample axial images, and sample standard flat images. The third labels represent appearance structural features corresponding to the sample side images and sample axial images. The processor may obtain the third training samples from historical processing data, and the third labels are obtained through manual annotation.

In some embodiments, the processor may adjust the rotational speed of the mandrel during the processing with the spinning wheel based on the appearance structural features. The processor determines an adjusted rotational speed of the mandrel based on a seventh preset algorithm. The adjusted rotational speed of the mandrel is positively correlated with the preset rotational speed, symmetry, and inclination. The seventh preset algorithm includes equation (7):

$$v_{tp} = v_{xy} \times (1 + D_C \times D'_C + Q_x \times Q'_x) \quad (7)$$

Where $v_{tp}$ represents the adjusted rotational speed of the mandrel. $v_{xy}$ is the preset rotational speed of the mandrel. $D_c$ represents the symmetry degree. $\acute{D}_c$ is the symmetry weight. $Q_x$ represents the inclination degree. $\acute{Q}_x$ is the inclination weight. The symmetry weight and inclination weight are ninth preset values determined by the processor based on a frequency of asymmetry and/or inclination occurring in Y-bars in historical processing data that cannot be remedied. The higher the frequency of asymmetry occurring, the greater the symmetry weight may be. The higher the frequency of inclination occurring, the greater the inclination weight can be.

By using the appearance model, the appearance structural feature of the Y-bar may be quickly and accurately determined, and further, the rotational speed of the mandrel during the processing with the spinning wheel may be adjusted. This can effectively ensure that in the event of accidental errors during the processing of the Y-bar, subsequent adjustments to the rotational speed of the mandrel may be made to correct the Y-bar, thereby improving product quality and reducing the reject rate.

In some embodiments, there exists a first preset correlation between a bar height and a width of the saturated I-bar structure and an outer diameter of the cylindrical member blank, a shearing amount of the shear spinning wheel, and a feeding amount of the shear spinning wheel.

The outer diameter of the cylindrical member blank refers to an outer diameter of the cylindrical member blank (e.g., rough cast).

The shearing amount of the shear spinning wheel refers to a depth at which the shear spinning wheel cuts into the cylindrical member blank during the spinning process. The shearing amount of the shear spinning wheel may affect the processing quality of the workpiece. For example, an excessive shearing amount may lead to excessive shearing of the workpiece, resulting in a decrease in the surface quality or the occurrence of cracks; a too small shearing amount may prevent the workpiece from achieving the desired forming effect. For more information about the shearing amount, please refer to the previous text.

The feeding amount of the shear spinning wheel refers to a distance that the shear spinning wheel moves axially along a generatrix direction of the cylindrical member blank after entering it.

The bar height of the saturated I-bar structure refers to a parameter that characterizes the vertical span or vertical coverage of the bar of the saturated I-bar structure. For example, if a saturated I-bar structure is formed on the surface of a cylindrical member through spinning technology, the bar height of this saturated I-bar structure may be a height of the bar protruding from the surface of the workpiece.

The width of the saturated I-bar structure refers to a parameter that characterizes the horizontal span or horizontal coverage of the bar of the saturated I-bar structure. For example, if a saturated I-bar structure is formed on the surface of a cylindrical member through spinning technology, and the bar of this saturated I-bar structure extends circumferentially along the surface of the workpiece, then the width of the bar may be the shortest distance between the two edges of the bar.

The first preset correlation refers to a mathematical relationship between the bar height of the saturated I-bar structure, the width of the saturated I-bar structure, the outer diameter of the cylindrical member blank, the shearing amount of the shear spinning wheel, and the feeding amount of the shear spinning wheel. The bar height of the saturated I-bar structure may be calculated based on the outer diameter of the cylindrical member blank, the shearing amount of the shear spinning wheel, and the feeding amount of the shear spinning wheel. For example, the processor may calculate the bar height of the saturated I-bar structure based on an eighth preset algorithm, which may include equation (8):

$$h_s \approx \frac{\sqrt{D_1^2 + 4f_s D_1} - D_1}{2} \quad (8)$$

wherein, $D_1=D_0-2s$; $h_s$ represents the bar height of the saturated I-bar structure, $D_0$ is the outer diameter of the cylindrical member blank, s is the shearing amount of the shear spinning wheel, and $f_s$ is the feeding amount of the shear spinning wheel.

In some embodiments, the width $W_s$ of the saturated I-bar structure is approximately equal to the shearing amount s of the shear spinning wheel.

Through the preset first correlation and the preset parameters such as the bar height of the saturated I-bar structure, the width of the saturated I-bar structure, and the outer diameter of the cylindrical member blank, the shearing amount and feeding amount of the shear spinning wheel involved in the I-bar structure during the processing may be determined more scientifically, which may improve the processing efficiency and precision of the I-bar structure.

In some embodiments, there exists a second preset correlation between the height, width, web thickness, flange thickness of the T-bar of the T-bar cylindrical member, and the shearing amount of the shear spinning wheel and the feeding amount of the fractal spinning wheel.

The height of the T-bar of the T-bar cylindrical member refers to a parameter that represents a length of a vertical part (i.e., the flange) of the T-bar structure. For example, when a T-bar structure is formed on the surface of a cylindrical member through spinning technology, the height of the T-bar may be a distance from the bottom to the topmost point.

The width of the T-bar of the T-bar cylindrical member refers to a parameter that represents a width of a crossbar part (i.e., a horizontal top part of the T-bar). For example, when a T-bar structure is formed on the surface of a cylindrical member through spinning technology, the width of the T-bar structure may be the width of the crossbar part from left to right.

The web thickness of the T-bar of the T-bar cylindrical member refers to a parameter that represents the height of the vertical part of the T-bar structure.

The flange height of the T-bar of the T-bar cylindrical member refers to a parameter that represents the height of the horizontally protruding part of the T-bar structure.

Figure 12:
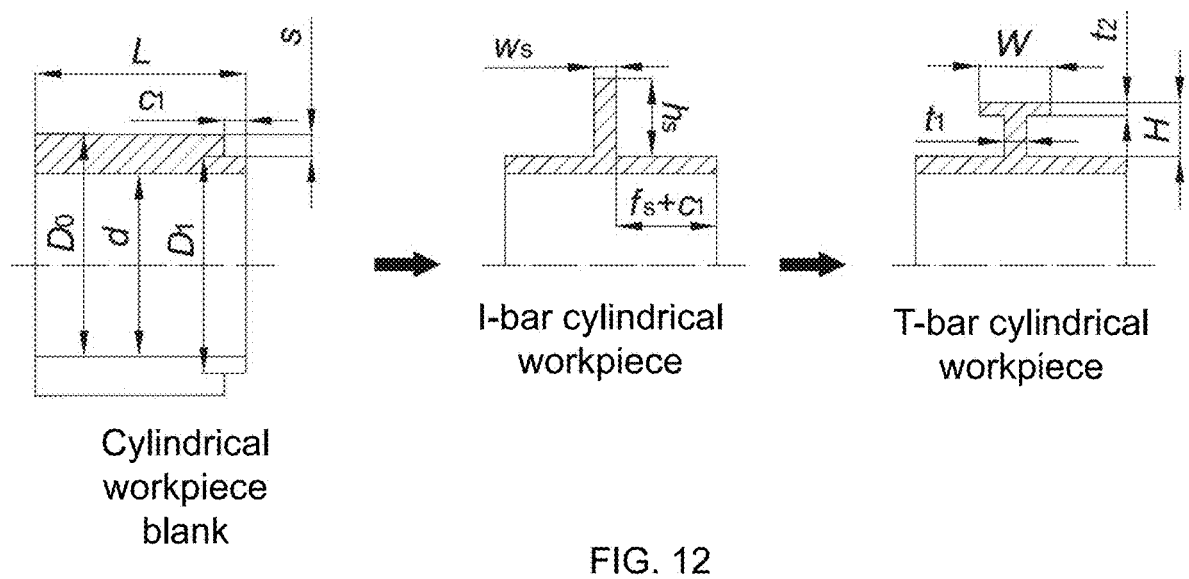
FIG. 12 is a localized schematic diagram illustrating a staged shearing and forming of a T-bar cylindrical member according to some embodiments of the present disclosure.

FIG. 12 is a localized schematic diagram illustrating a staged shearing and forming of a T-bar cylindrical member according to some embodiments of the present disclosure.

The second preset correlation refers to a mathematical relationship existing between the height, width, web thickness, flange thickness of the T-bar of the T-bar cylindrical member, the shearing amount of the shear spinning wheel, and the feeding amount of the fractal spinning wheel. The height of the T-bar may be calculated based on the width, web thickness, flange thickness of the T-bar, the shearing amount of the shear spinning wheel, and the feeding amount of the fractal spinning wheel. For example, the processor may calculate the height of the T-bar based on a ninth preset algorithm, which includes equation (9):

$$H \approx h_s - f_p \qquad (9)$$

wherein, H represents the height of the T-bar, $h_s$ represents the bar height of the saturated I-bar structure, and $f_p$ represents the feeding amount of the fractal spinning wheel.

In some embodiments, the processor may calculate the width of the T-bar based on a tenth preset algorithm, which includes equation (10):

$$W \approx \frac{(D_1 + 2h_s - f_p - 0.5s)*(2f_p + s)}{S*(D_1 + 2h_s - 2f_p - 0.5s)} \qquad (10)$$

Wherein, the web thickness $t_1 \approx s$, the flange thickness $t_2 \approx 0.5s$, $h_s$ represents the bar height of the saturated I-bar structure, $f_p$ represents the feeding speed of the fractal spinning wheel, and s represents the shearing amount of the shear spinning wheel.

The parameters of the T-bar structure (web height, flange height, web thickness, flange thickness, etc.) are controlled by the shearing amount of the shear spinning wheel, the feeding amount of the shear spinning wheel, the feeding amount of the fractal spinning wheel, the feeding amount of the flat spinning wheel, and the preset second correlation, without being limited by the geometric factors of the mold and the cylinder blank. Therefore, one or more embodiments of the present disclosure are conducive to forming small-sized T-bar structures (mm-level) on large-diameter cylinders (m-level), thus improving the forming limit of T-bar cylindrical members.

Here is a specific embodiment as an example.

Figure 4:
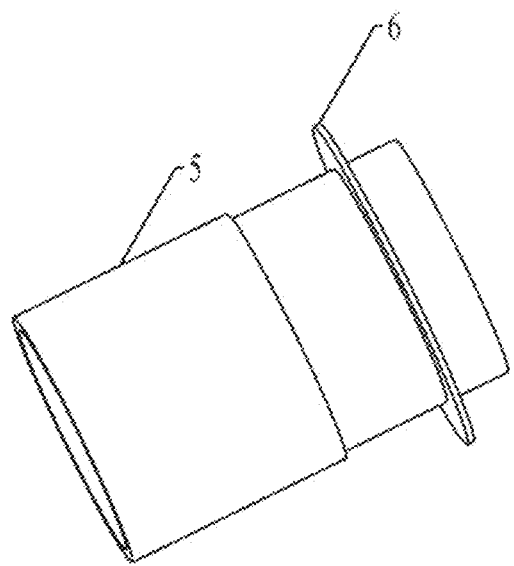
FIG. 4 is a structural diagram illustrating a saturated I-bar cylindrical member according to some embodiments of the present disclosure.
Figure 5:
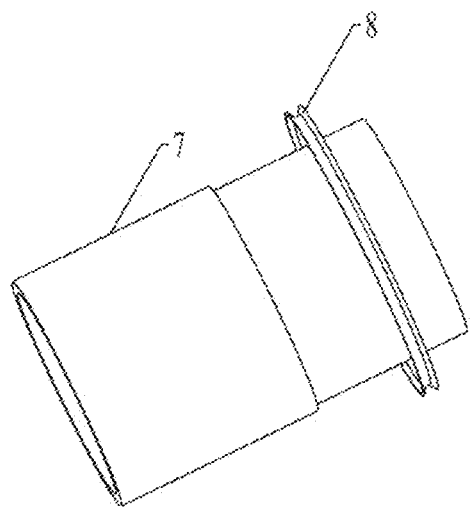
FIG. 5 is a structural diagram illustrating a Y-bar cylindrical member according to some embodiments of the present disclosure.

Referring to FIGS. 1-12, the formed 6061 aluminum alloy T-bar cylindrical member 9 (as shown in FIG. 6) in this embodiment has the following geometric dimensions: an outer diameter D1 of 198 mm, an inner diameter d of 180 mm, and the processed T-bar (as shown in FIG. 12) with a height H of 4 mm, a width W of 5 mm, a web thickness $t_1$ of 1 mm, and a flange thickness $t_2$ of 0.5 mm. Based on the geometric dimensions of the T-bar cylindrical member 9 (as shown in FIG. 6), the geometric dimensions of the I-bar cylindrical member 5 (as shown in FIG. 4) may be known: the bar height $h_s$ of the I-bar (as shown in FIG. 12) is 6 mm, the bar width W is 1 mm; the geometric dimensions of the cylindrical member blank 1 (as shown in FIG. 12) are: an outer diameter $D_0$ of 200 mm, an inner diameter d of 180 mm, and the length C1 of the positioning step 2 (as shown in FIG. 12) is 0.5~1.5 mm; the diameter of the mandrel 11 (as shown in FIG. 12) is 179 mm.

As shown in FIG. 11, the graded shearing and forming method for a T-bar cylindrical member specifically includes the following steps: preliminary design of graded shearing and forming process parameters: With the T-bar cylindrical member 9 as the target workpiece, the following key process parameters are designed based on the key geometric dimensions (height H, width W, web thickness $t_1$, flange thickness $t_2$) of the T-bar cylindrical member 9: the shearing amount s of the shear spinning wheel is 1 mm, the feeding amount $f_s$ is 6.2 mm, and the feeding speed is 1 mm/s; the thinning amount of the flow spinning wheel is 1 mm, the feeding amount is 10 mm, the feeding speed is 1 mm/s, and the intervention time is 6.1 s; the feeding amount $f_p$ of the fractal spinning wheel is 2 mm, and the feeding speed is 1.5 mm/s; the feeding amount of the flat spinning wheel is 2 mm, and the feeding speed is 1 mm/s; the spindle speed is 90 rpm.

wherein, the relationships between the shearing amount s of the shear spinning wheel, the feeding amount $f_s$ of the shear spinning wheel, the feeding amount $f_p$ of the fractal spinning wheel, and the geometric dimensions of the T-bar cylindrical member 9 satisfy the aforementioned equations (9) and (10).

These equations are used to design key process parameters such as the shearing amount of the shear spinning wheel, reducing the cost and time of process parameter design and helping to improve production efficiency.

The present disclosure provides a graded shearing and forming method for a T-bar cylindrical member, which includes the following steps:

S1, mounting a cylindrical blank onto a mandrel of a numerically controlled spinning machine, and assembling a shear spinning wheel, a flow spinning wheel, a fractal spinning wheel, and a flat spinning wheel on a spinning wheel stand of the numerically controlled spinning machine.

S2, adjusting the shear spinning wheel so that its shearing working surface contacts the surface of the cylindrical blank, starting the numerically controlled spinning machine, allowing the cylindrical blank to rotate circumferentially under the driving of the mandrel, meanwhile, controlling an axial feeding of the shear numerically controlled until it reaches a feeding amount, thus forming an unsaturated I-bar cylindrical member with an unsaturated I-bar structure.

S3, adjusting the flow spinning wheel so that its working surface contacts a surface of the unsaturated I-bar cylindrical member perpendicularly, maintaining a rotational state of the cylindrical blank from step S2, wherein the flow spinning wheel thins an unthinned side of the unsaturated I-bar cylindrical member to make wall thicknesses on both sides equal, after that, the flow spinning wheel performs axial extrusion shaping on the unsaturated I-bar structure to obtain a saturated I-bar cylindrical member with a saturated I-bar structure.

S4, adjusting the fractal spinning wheel so that its fractal working surface contacts a top of the saturated I-bar structure, maintaining the rotational state of the cylindrical blank from step S2, conducting a radial feed movement of the fractal spinning wheel until it reaches the feeding amount, thus forming a Y-bar cylindrical member with a Y-bar.

S5, adjusting the flat spinning wheel so that its working surface contacts the surface of the Y-bar cylindrical member perpendicularly, maintaining the rotational state of the cylindrical blank from step S2, wherein the flat spinning wheel applies radial loading along the top of the Y-bar to reshape the Y-bar cylindrical member into the T-bar cylindrical member.

In some embodiments, the end of the cylindrical blank in step S1 is processed with a positioning step, and a height of the positioning step is equal to the shearing amount of the shear spinning wheel in step S2.

In some embodiments, the shear spinning wheel includes an upper shearing working surface and a lower shearing working surface with an angle of 90° between them. The upper and lower shearing working surfaces are connected by a transition fillet, and a radius of the transition fillet is 0.5 to 3 mm.

In some embodiments, the flow spinning wheel is a biconical angle spinning wheel with a spinning wheel forming angle of 0 to 30° and a radius of the transition fillet of 0.5 to 3 mm. A thinning amount of the flow spinning wheel is equal to the shearing amount of the shear spinning wheel.

In some embodiments, the fractal shear spinning wheel is a biconical angle shear spinning wheel with a shear spinning wheel forming angle of 30 to 45° and the radius of the transition fillet of 0.5 to 3 mm.

In some embodiments, the shear spinning wheel forming angle of the flat shear spinning wheel is 0°, and the feeding amount of the flat shear spinning wheel is equal to the feeding amount of the fractal shear spinning wheel.

In some embodiments, a count of shear spinning wheels, flow shear spinning wheels, fractal shear spinning wheels, and flat shear spinning wheels set up is 2 each, and they are symmetrically installed on the shear spinning wheel stand of the numerically controlled spinning machine.

In some embodiments, the rotational speed of the mandrel is 30 to 180 rpm, the feeding speed of the shear spinning wheel is 0.5 to 2 mm/s, the feeding speed of the flow spinning wheel is 0.3 to 3 mm/s, the feeding speed of the fractal spinning wheel is 0.5 to 2.5 mm/s, and the feeding speed of the flat spinning wheel is 0.5 to 2.5 mm/s.

In some embodiments, during step S3, the bar height ($h_s$) and width ($w_s$) of the saturated I-bar structure satisfy the relationship expressed by equation (8), where the bar height ($h_s$) is determined by the outer diameter of the cylindrical blank ($D_O$), the shearing amount (s) of the shear spinning wheel, and the feeding amount ($f_s$) of the shear spinning wheel.

The width of the saturated I-bar structure ($w_s$) is approximately equal to the shearing amount (s).

In some embodiments, the height (H), width (W), web thickness ($t_1$), flange thickness ($t_2$) of the T-bar cylindrical member, the shearing amount (s) and feeding amount ($f_s$) of the shear spinning wheel, as well as the feeding amount ($f_p$) of the fractal spinning wheel, satisfy the relationships expressed by equations (9) and (10).

The embodiments of the present disclosure also provide a staged shearing and forming system of a T-bar cylindrical member, which comprises a first control module, a second control module, a third control module, a fourth control module, a fifth control module, and a sixth control module.

The first control module is configured to control a shear working surface of a shear spinning wheel in contact with a surface of a cylindrical member blank; wherein the shear spinning wheel is mounted on a spinning wheel stand of a numerically controlled spinning machine, and the cylindrical member blank is mounted on a mandrel of the numerically controlled spinning machine.

The second control module is configured to control a circumferential rotation of the cylindrical member blank driven by the mandrel and control an axial feeding of the shear spinning wheel along the cylindrical member blank until a feeding amount of the shear spinning wheel satisfies a first preset condition, thus obtaining an unsaturated I-bar cylindrical member with an unsaturated I-bar structure.

The third control module is configured to control a working surface of a flow spinning wheel to be in perpendicular contact with a surface of the unsaturated I-bar cylindrical member and control the cylindrical member blank to be maintained in a circumferential rotational state, the flow spinning wheel being mounted on the spinning wheel stand of the numerically controlled spinning machine.

The fourth control module is configured to control the flow spinning wheel to thin one side of the unsaturated I-bar cylindrical member until a wall thickness difference on both sides of the unsaturated I-bar cylindrical member satisfies a preset difference condition, control the flow spinning wheel to shape the unsaturated I-bar structure, thus obtaining a saturated I-bar cylindrical member with a saturated I-bar structure.

The fifth control module is configured to control a fractal working surface of a fractal spinning wheel in contact with a top of the saturated I-bar structure, control the cylindrical member blank to maintain the circumferential rotation state, thereby controlling the fractal spinning wheel to perform a radial feeding movement, until a feeding amount of the fractal spinning wheel satisfies a second preset condition to obtain a Y-bar cylindrical member with a Y-bar, the fractal spinning wheel being mounted on the spinning wheel stand of the numerically controlled spinning machine.

The sixth control module is configured to control a working surface of a flat spinning wheel to be in perpendicular contact with a surface of the Y-bar cylindrical member, control the cylindrical member blank to maintain the circumferential rotational state, control the flat spinning wheel to feed radially along a top of the Y-bar to obtain a T-bar cylindrical member, the flat spinning wheel being mounted on the spinning wheel stand of the numerically controlled spinning machine.

In some embodiments, the staged shearing and forming system of a T-bar cylindrical member may further include a processor. The processor is capable of communicating with a numerically controlled spinning machine. The processor may be used to collect, analyze, store, and process data, and generate control instructions to be sent to an actuator, enabling the actuator to perform corresponding actions.

In some embodiments, the processor may control the first control module, the second control module, the third control module, the fourth control module, the fifth control module, and the sixth control module for data transmission. The processor may generate operational instructions and send them to each module, thus controlling the processing of the cylindrical blank by each module. For example, the processor may generate and send operational instructions to the first control module to bring the shearing surface of the shear spinning wheel into contact with the surface of the cylindrical blank. In some embodiments, the first control module, the second control module, the third control module, the fourth control module, the fifth control module, and the sixth control module may be components included in the processor.

The embodiments of the present disclosure also provide a non-transitory computer-readable storage medium, comprising a set of instructions, wherein when a computer reads the computer instructions in the storage medium, the staged shearing and forming system of a T-bar cylindrical member is implemented. The storage medium may be a volatile or non-volatile computer-readable storage medium.

What is claimed is:

1. A graded shearing and forming method for a T-bar cylindrical member, comprising:
    S1, mounting a cylindrical blank onto a mandrel of a numerically controlled spinning machine, and assembling a shear spinning wheel, a flow spinning wheel, a fractal spinning wheel, and a flat spinning wheel on a spinning wheel stand of the numerically controlled spinning machine;
    S2, adjusting the shear spinning wheel so that a shearing working surface of the shear spinning wheel contacts a surface of the cylindrical blank, starting the numerically controlled spinning machine, allowing the cylindrical blank to rotate circumferentially under driving of the mandrel, controlling an axial feeding of the shear spinning wheel along the cylindrical blank until a feeding amount of the shear spinning wheel is reached, thus forming an unsaturated I-bar cylindrical member with an unsaturated I-bar structure;
    S3, adjusting the flow spinning wheel so that a working surface of the flow spinning wheel contacts a surface of the unsaturated I-bar cylindrical member perpendicularly, maintaining a rotational state of the cylindrical blank from S2, wherein the flow spinning wheel thins an unthinned side of the unsaturated I-bar cylindrical member to make wall thicknesses on both sides equal, then the flow spinning wheel performs axial extrusion shaping on the unsaturated I-bar structure to obtain a saturated I-bar cylindrical member with a saturated I-bar structure;
    S4, adjusting the fractal spinning wheel so that a fractal working surface of the fractal spinning wheel contacts a top of the saturated I-bar structure, maintaining the rotational state of the cylindrical blank from S2, conducting a radial feed movement of the fractal spinning wheel until a feeding amount of the fractal spinning wheel is reached, thus forming a Y-bar cylindrical member with a Y-bar; and
    S5, adjusting the flat spinning wheel so that a working surface of the flat spinning wheel contacts a surface of the Y-bar cylindrical member perpendicularly, maintaining the rotational state of the cylindrical blank from S2, wherein the flat spinning wheel applies radial loading along a top of the Y-bar to reshape the Y-bar cylindrical member into the T-bar cylindrical member.

2. The graded shearing and forming method for a T-bar cylindrical member of claim 1, wherein an end of the cylindrical blank in S1 is processed with a positioning step, and a height of the positioning step is equal to a shearing amount of the shear spinning wheel in S2.

3. The graded shearing and forming method for a T-bar cylindrical member of claim 1, wherein the shear spinning wheel includes an upper shearing working surface and a lower shearing working surface disposed at 90° relative to each other, the upper shearing working surface and the lower shearing working surface are connected by a transition fillet, and a radius of the transition fillet is in a range of 0.5 to 3 mm.

4. The graded shearing and forming method for a T-bar cylindrical member of claim 1, wherein the flow spinning wheel is a biconical angle spinning wheel with a spinning wheel forming angle of 0 to 30° and a radius of a transition fillet of 0.5 to 3 mm, and a thinning amount of the flow spinning wheel is equal to a shearing amount of the shear spinning wheel.

5. The graded shearing and forming method for a T-bar cylindrical member of claim 1, wherein the fractal spinning wheel is a biconical angle spinning wheel with a spinning wheel forming angle of 30 to 45° and a radius of a transition fillet of 0.5 to 3 mm.

6. The graded shearing and forming method for a T-bar cylindrical member of claim 1, wherein a spinning wheel forming angle of the flat spinning wheel is 0°, and a feeding amount of the flat spinning wheel is equal to the feeding amount of the fractal spinning wheel.

7. The graded shearing and forming method for a T-bar cylindrical member of claim 1, wherein a count of shear spinning wheels, a count of flow spinning wheels, a count of fractal spinning wheels, and a count of flat spinning wheels are 2, respectively, and the flow spinning wheels, the fractal spinning wheels, and the flat spinning wheels are symmetrically installed on the spinning wheel stand of the numerically controlled spinning machine.

8. The graded shearing and forming method for a T-bar cylindrical member of claim 1, wherein a rotational speed of the mandrel is 30 to 180 rpm, a feeding speed of the shear spinning wheel is 0.5 to 2 mm/s, a feeding speed of the flow spinning wheel is 0.3 to 3 mm/s, a feeding speed of the fractal spinning wheel is 0.5 to 2.5 mm/s, and a feeding speed of the flat spinning wheel is 0.5 to 2.5 mm/s.

9. The graded shearing and forming method for a T-bar cylindrical member of claim 1, wherein a bar height of the saturated I-bar structure is $h_s$, and a width of the saturated I-bar structure is $w_s$, where the bar height $h_s$ and an outer diameter $D_0$ of the cylindrical blank, a shearing amount s of the shear spinning wheel, and the feeding amount $f_s$ of the shear spinning wheel satisfy a relationship as follows:

$$h_s \approx \sqrt{D_1^2 + 4f_s D_1} - D_1/2$$

wherein, $D_1 = D_0 - 2s$; and
$w_s \approx s$.

10. The graded shearing and forming method for a T-bar cylindrical member of claim 9, wherein a height H, a width W, a web thickness $t_1$, and a flange thickness $t_2$ of a T-bar of the T-bar cylindrical member, the shearing amount s of the shear spinning wheel, and the feeding amount $f_p$ of the fractal spinning wheel satisfy a relationship as follows:

$$H \approx h_s - f_p, W \approx (D_1 + 2h_s - f_p - 0.5s)*(2f_p + s)/S*(D_1 + 2h_s - 2f_p - 0.5s), t_1 \approx s, t_2 \approx 0.5s.$$

* * * * *